US012524317B1

(12) United States Patent
Gupta et al.

(10) Patent No.: US 12,524,317 B1
(45) Date of Patent: Jan. 13, 2026

(54) BACKUP AND RECOVERY FOR COMPUTING OBJECTS WITH HIERARCHICAL PAGE STRUCTURES

(71) Applicant: Rubrik, Inc., Palo Alto, CA (US)

(72) Inventors: Anshul Gupta, Mountain View, CA (US); Vaibhav Bhagee, New Delhi (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 19/037,047

(22) Filed: Jan. 24, 2025

(51) Int. Cl.
*G06F 11/14* (2006.01)

(52) U.S. Cl.
CPC ...... *G06F 11/1469* (2013.01); *G06F 2201/84* (2013.01)

(58) Field of Classification Search
None
See application file for complete search history.

(56) References Cited

U.S. PATENT DOCUMENTS

| 10,872,059 B2 * | 12/2020 | Desai | G06F 16/128 |
| 2014/0279526 A1 * | 9/2014 | Jackson | G06Q 20/381 |
| | | | 705/44 |
| 2015/0310179 A1 * | 10/2015 | Chengat | G16Z 99/00 |
| | | | 705/3 |
| 2018/0314603 A1 * | 11/2018 | Gibbons, Jr. | H04L 67/1097 |
| 2021/0109814 A1 * | 4/2021 | Dewey | G06F 3/067 |
| 2021/0117120 A1 * | 4/2021 | Edwards | G06F 3/0614 |
| 2021/0365185 A1 * | 11/2021 | Shtarkman | G06F 11/2094 |
| 2022/0171536 A1 * | 6/2022 | Watson | G06F 3/065 |
| 2024/0248991 A1 * | 7/2024 | Chinni | G06F 21/564 |
| 2024/0273226 A1 * | 8/2024 | Brajkovic | G06F 21/6218 |
| 2025/0165353 A1 * | 5/2025 | Gupta | G06F 11/1461 |
| 2025/0165354 A1 * | 5/2025 | Gupta | G06F 11/1464 |

* cited by examiner

*Primary Examiner* — Eddy Cheung

(74) *Attorney, Agent, or Firm* — Holland & Hart LLP

(57) ABSTRACT

Methods, systems, and devices for data management are described. A data management system (DMS) may receive a request to back up a software-as-a-service (SaaS) application including a set of computing objects. The computing objects within the set of computing objects may include respective sets of pages. The DMS may access, based on the request, first sets of metadata and first sets of data elements of a first set of pages included in a first computing object. The DMS may store, for each page in the first set of pages included in the first computing object, a respective first set of metadata in one or more first fields of a respective page structure defined by a page schema at the DMS and a respective first set of data elements in a second field of the respective page structure defined by the page schema.

20 Claims, 12 Drawing Sheets

BACKUP AND RECOVERY FOR COMPUTING OBJECTS WITH HIERARCHICAL PAGE STRUCTURES

FIELD OF TECHNOLOGY

The present disclosure relates generally to data management, including techniques for reauthentication of a data management system for multiple applications associated with common credentials.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
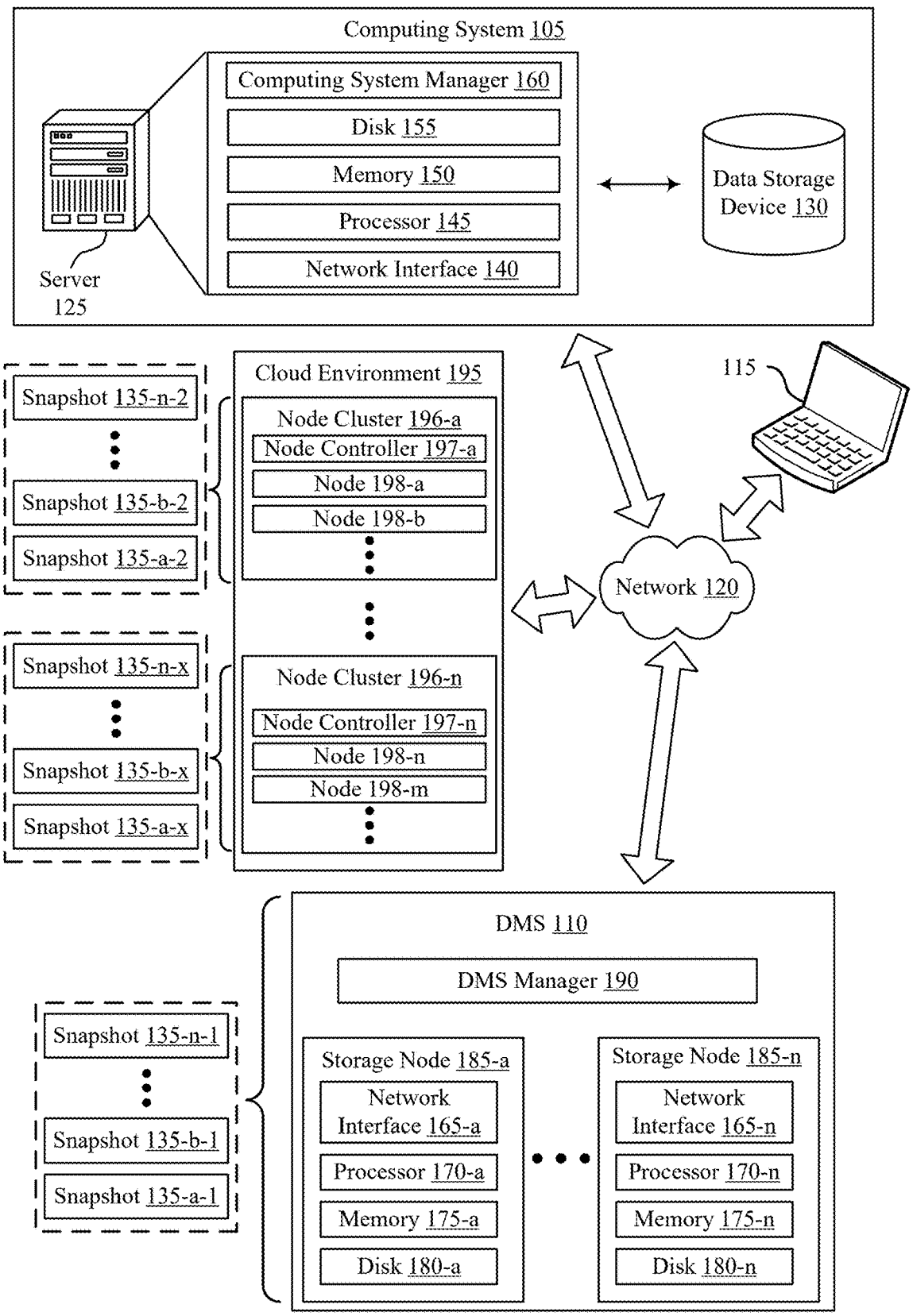
FIG. 1 illustrates an example of a computing environment that supports backup and recovery for computing objects with hierarchical page structures in accordance with aspects of the present disclosure.

A data management system (DMS) may provide backup or recovery services for a software-as-a-service (SaaS) application provided by an application provider based on a backup configuration. To allow the DMS to provide the backup and recovery services for an SaaS application, a customer (e.g., a user, a set of users, a client) may provide, to the DMS, authentication credentials so that the DMS can access user data stored by the SaaS application. The DMS may implement an authentication framework to maintain and utilize authentication credentials (e.g., open authorization (OAuth) credentials) to access various SaaS applications. In some cases, the DMS may update the backup configuration to expand the provided backup or recovery services for the SaaS application to include additional features. The updated version of the backup configuration may utilize expanded authentication credentials to support the additional features, and as such, the DMS may reauthenticate to the SaaS application to obtain additional permissions to support the additional features. To support reauthentication, the DMS may detect that a current version number of the backup configuration used by a customer is less than the updated version number, and the DMS may trigger a reauthentication of procedure to request the expanded authentication credentials from the customer.

In some cases, however, a single application provider may provide multiple SaaS applications, and a single set of authentication credentials from the single application provider may be used to access the multiple SaaS applications. Additionally, a backup procedure for the SaaS applications may be associated with a version number, but some customers or clients may not be configured with (e.g., may not pay for) backup services for at least some of the SaaS applications. Thus, a simple comparison between the previously authenticated version number for the backup procedure and the new version number associated with the updated backup procedure may result in an unnecessary customer reauthentication, as the updates may not be applicable to the application that the customer supports.

To support multiple versions of a backup configuration (e.g., providing backup and recovery services to multiple sets of SaaS applications), the DMS may flag customer (e.g., client) to indicate whether the customer supports (e.g., wants backup services for) one or more SaaS applications provided by a single application provider and accessible via a single set of credentials. A backup application for the multiple applications may be documented via a single version number. When the backup procedure is updated (e.g., configuration changes), the single version number is updated. Reauthentication may be triggered for customers when the permissions associated with the update are more than the permissions that were associated with a previous version of the backup application authenticated by the customer. Additionally, the previously authenticated version may be based on whether the customer is configured to support one or more multiple applications. Thus, for each customer, application flags are maintained to indicate support for one or more applications, and the previously authenticated version number is based on the support for the one or more applications.

In some examples, techniques described herein may enable backup and recovery for computing objects with hierarchical page structures. For example, an application (e.g., an SaaS application) may host customer information in a hierarchical page structure. For example, customers of the application may generate multiple pages for each space in the application. A space may be a folder that corresponds to a particular set of users. Each page may include different types of elements such as text, images, or comments. It may be beneficial for the DMS to support backup of an application with such a hierarchical page structure.

According to techniques described herein, the DMS may perform a page level backup procedure for an application with a hierarchical page structure. The DMS may implement a schema that includes a data object for each space in the application, and the schema may include one or more data fields corresponding to one or more data elements of a page. The page schema may provide a template for data of a page that is to be backed up by the DMS. If the application is updated to add new types of data elements, the page schema provides increased flexibility for updating what data is read and stored from each page. For example, the page schema may be updated to include additional data fields corresponding to additional data elements added by an update to the application. A refresh job may detect such updates and trigger the update to the schema.

For some applications supporting a hierarchical page structure (e.g., SaaS applications), the backup data may be obtained by the DMS from the application using an API provided by the application. Initially, a full backup obtains the data of all pages of a space. To perform an incremental backup, the API call is configured with a start time parameter that corresponds to the end of the previous backup. The DMS may obtain data from updated or added pages since the previous backup in response to the API call. The API call may also be configured for error handling and job resumability. These and other techniques are described in further detail with respect to the figures.

FIG. 1 illustrates an example of a computing environment 100 that supports backup and recovery for computing objects with hierarchical page structures in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through SaaS or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant (e.g., client) of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples, techniques described herein may enable reauthentication of a DMS for multiple applications associated with common credentials. According to techniques described herein, the DMS 110 may support multiple versions of a backup configuration (e.g., providing backup and recovery services to multiple sets of SaaS applications). The DMS 110 may flag customer to indicate whether the customer supports (e.g., wants backup services for) one or more SaaS applications provided by a single application provider and accessible via a single set of credentials. The application provided may be stored on or executed by the computing system 105 or the cloud environment 195. A backup application for the multiple applications may be documented via a single version number. When the backup procedure is updated (e.g., configuration changes), the single version number is updated. Reauthentication may be triggered for customers when the permissions associated with the update are more than the permissions that were associated with a previous version of the backup application authenticated by the customer. Additionally, the previously authenticated version may be based on whether the customer is configured to support one or more multiple applications. Thus, for each customer, application flags are maintained to indicate support for one or more applications, and the previously authenticated version number is based on the support for the one or more applications.

In some examples, techniques described herein may enable backup and recovery for computing objects with hierarchical page structures. According to techniques described herein, the DMS 110 may perform a page level backup procedure for an application with a hierarchical page structure. The DMS 110 may implement a schema that includes a data object for each space in the application, and the schema may include one or more data fields corresponding to one or more data elements of a page. The page schema may provide a template for data of a page that is to be backed up by the DMS 110. If the application is updated to add new types of data elements, the page schema provides increased flexibility for updating what data is read and stored from each page. For example, the page schema may be updated to include additional data fields corresponding to additional data elements added by an update to the application. A refresh job may detect such updates and trigger the update to the schema.

Figure 2:
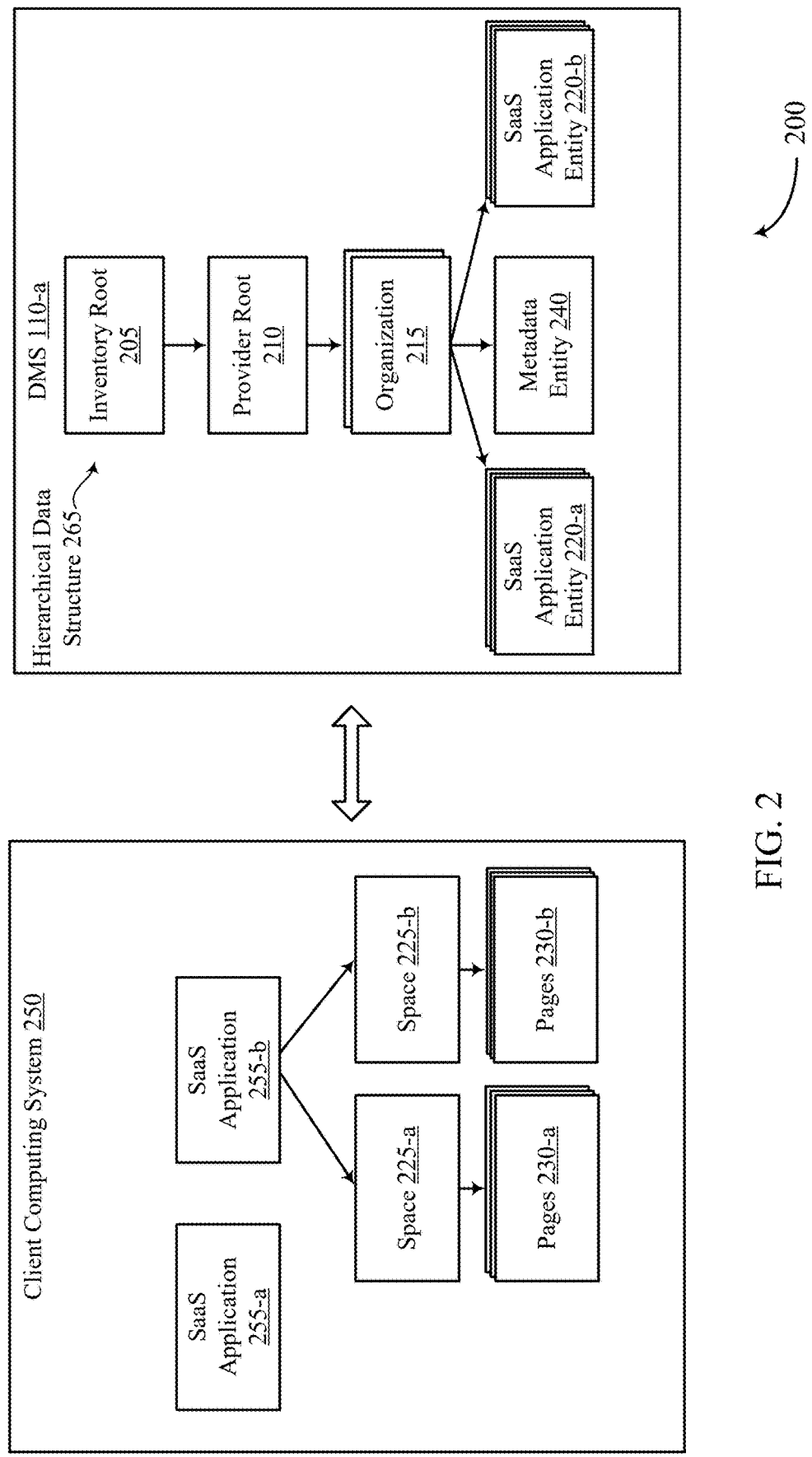
FIG. 2 shows an example of a SaaS application framework that supports backup and recovery for computing objects with hierarchical page structures in accordance with aspects of the present disclosure.

FIG. 2 shows an example of a SaaS application framework 200 that supports backup and recovery for computing objects with hierarchical page structures in accordance with aspects of the present disclosure. The SaaS application framework 200 may implement or be implemented by aspects of the computing environment 100 described with reference to FIG. 1. For example, the SaaS application framework 200 may include a DMS 110-*a*, which may be an example of the DMS 110 of FIG. 1, and a client computing system 250, which may be an example of the computing system 105 of FIG. 1.

The client computing system 250 may include and execute a SaaS application 255-*a* and a SaaS application 255-*b*. While the SaaS application 255-*a* and the SaaS application 255-*b* are shown in the same client computing system 250, it should be understood that the SaaS application 255-*a* and the SaaS application 255-*b* may be supported by and/or executed by one or more logical and/or physical computing environments. Additionally, the SaaS application 255-*a* and the SaaS application 255-*b* may be provided by a same application provider such that the SaaS application 255-*a* and the SaaS application 255-*b* may be accessed using a same credential set. The SaaS application 255-*b* may store user data in one or more spaces 225 (e.g., a first space 225-*a* or a second space 225-*b*), which may also be referred to as "computing objects" herein. The spaces 225 may include or indicate one or more pages 230. For example, the first space 225-*a* may include pages 230-*a*, and the second space 225-*b* may include pages 230-*b*. Each of the pages 230 may be associated with a respective set of metadata, such as a page identifier, a title of the page, an identifier for the space (e.g., computing objects) in which the page is included. Additionally, each of the pages may include a respective set of data elements, such as content of the page including text, images, comments, etc.

The DMS 110-*a* may support backup and/or recovery services for the client computing system 250 including the SaaS application 255-*a* and the SaaS application 255-*b*. The DMS 110-*a* may maintain a hierarchical data structure 265 to support backup/recovery of the SaaS application 255-*a* and the SaaS application 255-*b*. Each of the spaces 225 of the SaaS application 255-*b* may be an example of a snappable, as described herein, in that the DMS 110-*a* may support obtaining data in order to generate respective backup snapshots of the spaces 225.

The hierarchical data structure 265 may include an inventory root 205. The inventory root 205 may include or address a provider root 210 that corresponds to a provider of the SaaS application 255-*a* and the SaaS application 255-*b*. The provider root 210 may include or address a set of organizations 215, each which corresponds to a client, user, or customer of the application provider that supports the SaaS applications 255. For example, a first organization 215 may correspond to the client computing system 250, and a second organization may correspond to a different client computing system. Additionally, the DMS 110-*a* may maintain one or more SaaS application entities 220-*a* (e.g., for one of the organizations 215) to support backup and/or recovery services for the SaaS application 255-*a* supported by the client computing system 250. The DMS may maintain one or more second SaaS application entities 220-*b* to support backup and/or recovery services for the SaaS application 255-*b*. The DMS 110-*a* may also maintain a metadata entity 240 that stores metadata for the various applications for which backup and/or recovery services are supported by the DMS 110-*a*

Each of the aspects of the hierarchical data structure 265 may be an example of a relational database table. Thus, the backups for the SaaS application 255-*a* and the SaaS application 255-*b* may be built on top of a relational SaaS framework. Snappables (e.g., computing objects, spaces) backed up by the DMS for the SaaS applications 255 (e.g., user data or customer data stored by the DMS) may be under the inventory root 205. The provider root 210 may be an ancestor of multiple organizations 215 associated with the application provider. The organization 215 may capture both computing objects (e.g., projects) of the SaaS application 255-a and spaces 225 of the SaaS application 255-b. The spaces 225 may be backed up in a same organization hierarchy as user data stored by the SaaS application 255-a. Each space 225 may be stored by the DMS as a separate snappable in the hierarchy. A space 225 may have be an associated with respective SaaS application entity 220-b which may represent the space 225 (e.g., a computing object). The backup of the entity may be used by an artificial intelligence (AI) engine (e.g., a chat or service bot). That is, the backups (e.g., snapshots) of the SaaS application 255-b may be used for training or providing retrieval augmentation for one or more AI models, such as a generative AI model.

The SaaS application 255-b may include a native support for backup procedures. However, the native backup procedures may be limited to an entire space 225. The native backup procedures may lack granularity and provide backups for a limited time period.

According to techniques described herein, the DMS 110-a may provide backup and recovery services for user data stored or accessed by the SaaS applications 255. For example, the DMS may utilize a single set of authorization credentials for the SaaS applications 255. The DMS may use an OAuth framework to authenticate the DMS 110-a on behalf of a user with appropriate permissions and store the credentials in a database. The DMS 110-a may use the OAuth framework to obtain data of or identify the spaces 225 of the SaaS application 255-b. For each space 225 (e.g., object), the DMS 110-a may trigger a job to perform a backup of the space 225. The backups may be obtained in a paginated manner using an application program interface (API) of the SaaS application 255-b (e.g., a contextual query language (CQL) representational state transfer (REST) API). The DMS 110-a may use synchronization tokens and commit tokens on a timestamp of a modified time of the pages 230 to support resumability of a full snapshot and incremental snapshots. The schema design, which is described in further detail herein, and backup services for the SaaS applications 255 (e.g., pages 230 of the SaaS application 255-b) may provide a robust, efficient, and user-centric approach to managing schema changes and backups in collaborative environments, such as the SaaS application 255-b.

Figure 3:
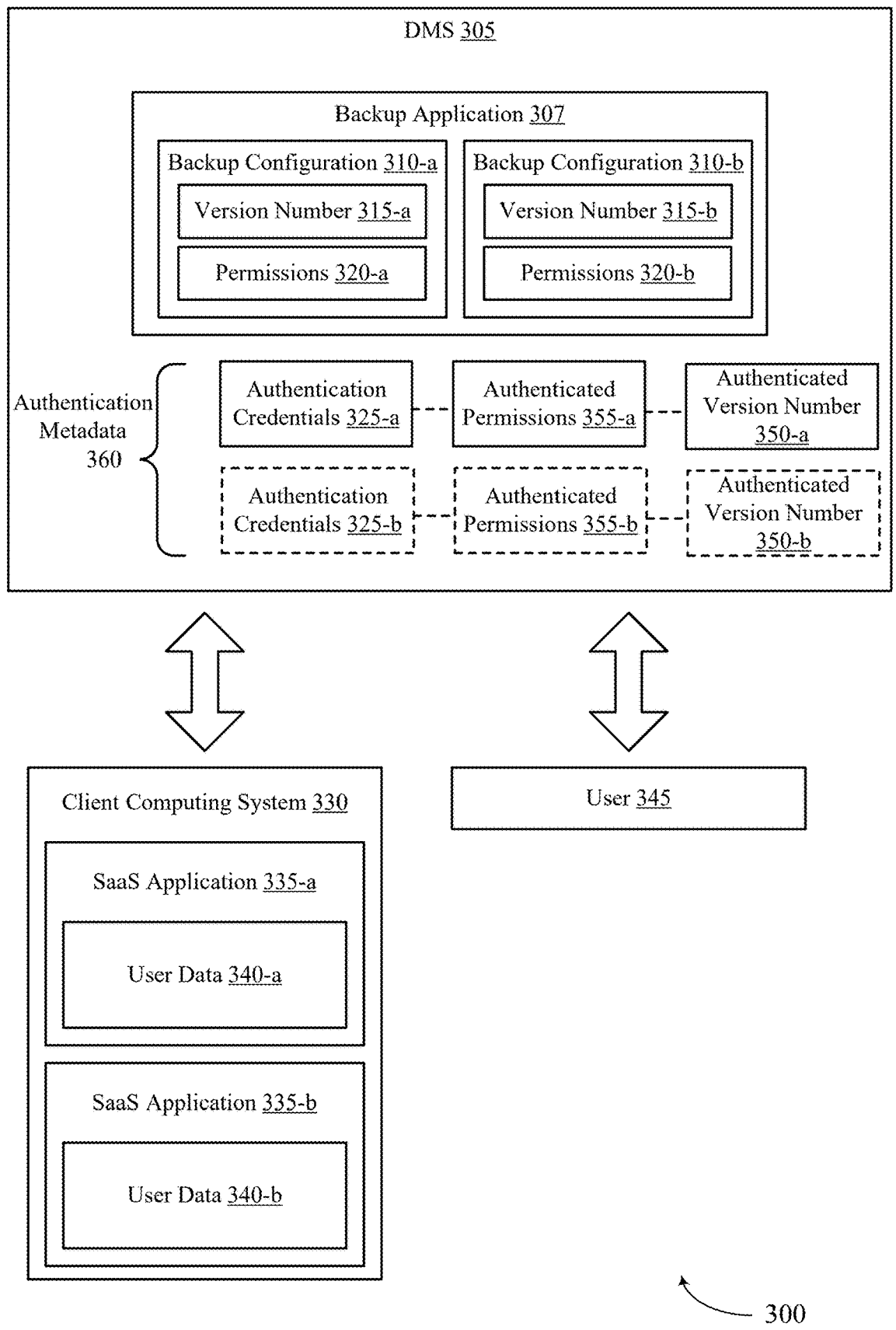
FIG. 3 shows an example of a system diagram that supports backup and recovery for computing objects with hierarchical page structures in accordance with aspects of the present disclosure.

FIG. 3 shows an example of a system diagram 300 that supports backup and recovery for computing objects with hierarchical page structures in accordance with aspects of the present disclosure. The system diagram 300 may implement or be implemented by aspects of the computing environment 100 or SaaS application framework 200 described with reference to FIGS. 1 and 2. For example, the system diagram 300 may include a DMS 305, which may be an example of a DMS 110 as described with reference to FIG. 1 or the DMS 110-a as described with respect to FIG. 2. The user 345 may be an example of a user of the computing system 105 or the device 115 as described with reference to FIG. 1. The user 345 may be a single user or a set of users associated with a customer or client of the DMS 110. The system diagram 300 may also include a client computing system 330, which may be an example of the client computing system 250 of FIG. 2. The DMS 305 may communicate with the client computing system 330 (e.g., one or more computing systems supporting SaaS applications 335 provided by a single application provider) and the user 345 to provide backup and recovery services for SaaS applications 335 (e.g., a first SaaS application 335-a and a second SaaS application 335-b) of the client computing system 330 The DMS 305 may provide the backup and recovery services via a backup application 307. The backup application 307 may support the backup and recovery services in accordance with a backup configuration 310.

To allow the DMS 305 to provide the backup and recovery services for the SaaS applications 335, the user 345 may provide, to the DMS 305, authentication credentials 325 so that the DMS 305 can access user data 340 stored or accessed by the SaaS application 335. For example, the DMS 305 may access user data 340-a stored by the first SaaS application 335-a and user data 340-b stored by the second SaaS application 335-b. The DMS 305 may implement an authentication framework to maintain and utilize authentication credentials (e.g., OAuth credentials or access token) to access data of various SaaS applications supported by a same application provider. In some cases, the DMS 305 may update the backup configuration 310 to expand the provided backup or recovery services for the SaaS application 335 to include additional features.

In example where the first SaaS application 335-a and the second SaaS application 335-b are not associated with the same application provider, the DMS 305 may provide backup and recovery services for the first SaaS application 335-a b using the backup configuration 310-a and an associated set of permissions 320-a. The DMS 305 may access the user data 340-a using the first authentication credentials 325-a. For example, the user may authenticate the backup application 307 to access the client computing system 330 to support backup and/or recovery services for the SaaS application 335-a using a first set of permissions 320-a, which are associated with the authentication credentials 325-a as authenticated permissions 355-b in authentication metadata 360. The DMS 305 may update the backup application 307 from the first backup configuration 310-a to the second backup configuration 310-b. The second backup configuration 310-b may support one or more additional features relative to the first backup configuration 310-a based on a second set of permissions 320-b. That is, the set of permissions may be updated such as to supported the additional features. The additional features may be accessed via one or more permissions not associated with the first authentication credentials 325-a. In such examples, the SaaS authentication framework utilized by the DMS 305 may trigger reauthentication when a version number 315 of a backup application 307 (e.g., the backup configuration 310 of the backup application 307) with which an organization was authenticated and authorized is lesser than the version number 315 of the backup application 307 in an updated backup application 307 (e.g., the code). For example, when privileges or permissions 320 get added to the backup configuration 310 to support additional services for a single application of a single application provider, the application version (e.g., the version number 315) may be incremented in code associated with the backup application 307. The upgrading may rely on an assumption that the set of permission scopes will increase in a way that a newer set of permission scopes may be a superset of an existing set of permission scopes. The DMS 305 may detect that a current version number (e.g., authenticated version number 350) of the backup configuration 310 used by a customer is less than the updated version number 315, and the DMS 305 may trigger a reauthentication of procedure to request the authentication credentials from the user 345 (e.g., authentication credentials 325-*b*).

As such, the DMS 305 may perform a reauthentication procedure with the user 345 to obtain the second authentication credentials 325-*b*. Note that the authentication credentials 325-*a* and the authentication credentials 325-*b* may be the same authentication credentials, but as described herein, reauthentication may be performed such as to update the permissions associated with the authentication credentials 325-*b*.

As the DMS 305 supports multiple backup configuration 310 for different permission scopes and multiple SaaS applications for the same application provider, a simple comparison between the previously authenticated version number 315 (e.g., the first version number 315-*a*) for the backup procedure and a new version number 315 (e.g., the second version number 315-*b*) associated with the updated backup procedure may cause an unnecessary customer reauthentication, as the updates may not be applicable to the SaaS applications 335 that the user 345 supports.

As such, the DMS 305 may support mechanism to extend authentication (e.g., OAuth) framework support to multiple applications in the same organization. For example, to support backup or recovery services to multiple SaaS applications 335 for a same organization of the application provider, the DMS 305 may support an extended OAuth framework that may support multiple snappable types for the same organization. The DMS 305 may support an authentication framework to enable authentication of multiple SaaS applications 335 provided by the same application provider. A single application provider may capture an OAuth workflow for multiple applications (e.g., the first SaaS application 335-*a*, the second SaaS application 335-*b*, or one or more additional SaaS applications 335). The DMS 305 may obtain authentication credentials 325 for multiple SaaS applications 335 from the user 345. The DMS 305 may utilize an OAuth framework that operates for multi-application organizations (e.g., the application provider).

The first authentication credentials 325-*a* may be stored at an organization level (e.g., the organization 215 of FIG. 2). The DMS 305 may obtain the OAuth credentials (e.g., the first authentication credentials 325-*a*) based on an organization type or organization identifier of the application provider. An organization type of the application provider be used for both the first SaaS application 335-*a* snappable types and the second SaaS application 335-*b* snappable types. The DMS 305 may store a mapping from snappable types to organization types to facilitate backup and recovery services. The DMS 305 may provide backup and recovery services for the multiple SaaS applications 335 based on the mapping between the organization type of the application provider and the snappable types of the multiple SaaS application 335.

The DMS 305 may store authentication metadata 360, which may include a mapping between the authentication credentials 325-*a*, the authenticated permissions 355-*a*, and the authenticated version number 350-*a*, among other information. For example, the authentication metadata 360 may include a client identifier (e.g., an identifier associated with the client computing system 330) for which backup and recovery services are supported by the DMS 305. The client identifier may be mapped to the authentication credentials 325, such as a universally unique identifier (UUID) which may uniquely identify a refresh or access token pair used by the DMS 110 to access one or more of the SaaS applications 335. The authentication metadata 360 may also include an indication of the authorizing user and an organization type (e.g., the application provider of the SaaS applications 335-*a*). The authentication metadata for the client computing system 330 may be referenced using a primary key such that: PRIMARY KEY={client ID, Authorizing user account ID}. The client identifier of the application may include or reference a foreign key such that: Foreign Key→saas_oauth_app_metadata. The token reference may also include or reference a foreign key such that: Foreign Key→sass_auth_token_metadata.

Some users 345 may not be configured with (e.g., may not pay for) backup services for some SaaS applications 335 provided by the application provider. For example, the DMS 305 may be configured to provide backup and recovery services for the first SaaS application 335-*a* for the user 345 but not the second SaaS application 335-*b*. Additionally, or alternatively, backup services for multiple products (e.g., SaaS applications 335) may be enabled in a different order. In such cases, the authenticated version number 350-*a* may be associated with a version number of the backup application 307 for the SaaS application 335-*a* for which backup and recovery services are enable for the client. Thus, in the case of the backup application 307 providing backup and recovery services for two SaaS applications 335 provided by the same application provider, the DMS 305 may may maintain indication of supported or enabled backup applications for each client.

In an illustrative example, a user 345 may already have backup and recovery services enabled (e.g., using a first backup configuration 310-*a*) for the first SaaS application 335-*a*. A first version number 315-*a* (e.g., application version) may be the first version number 315-*a* (e.g., v1). An identifier for the user 345 (e.g., a client) may be associated with a feature flag that indicates if the backup and recovery services are enabled for the first SaaS application 335-*a*. Thus, the feature flag may indicate that the backup configuration 310-*a* supports services for the SaaS application 335-*a* for the user 345.

Thus, the user 345 may originally be configured for the DMS 305 to provide backup and recovery services for the first SaaS application 335-*a*. The DMS 305 may subsequently receive an indication that the user 345 is configured with (e.g., pays for) backup and recovery services for the second SaaS application 335-*b*, and the DMS 305 may update one or more feature flags associated with the user 345 to indicate that the backup application 307 is to support the second SaaS application 335-*b*. Accordingly, the updated backup and recovery services may utilize a second backup configuration 310-*b* associated with a second set of permissions 320-*b* (e.g., including permissions for the first SaaS application 335-*a* and the second SaaS application 335-*b*). Because additional permissions are enabled for the customer by adding support for the second SaaS application 335-*b*, a reauthentication procedure may be triggered, the authentication credentials 325-*b* are obtained, and the authenticated permissions 355 are updated.

In accordance with the OAuth framework, the DMS 305 may store an authenticated version number 350 (e.g., application version) in authentication metadata 360, and the authenticated version number 350 may correspond to the first version number 315-*a* at a time when a reauthentication (or authentication) procedure was last preformed. A second version number 315-*b* may correspond to a latest or newest version of a backup application 307 supported by the DMS 305 (e.g., included in code). The DMS 305 may compare a latest version number 315 (e.g., the second version number 315-*b*) with the authenticated version number 350-*a* stored in the authentication metadata 360 for the user 345 or client.

If the authenticated permissions 355-*a* (e.g., privileges or scopes) corresponding to the authenticated version number 350-*a* (e.g., stored in a database or the metadata associated with the user 345) is a superset of the permissions 320-*b* (e.g., privileges or scopes) corresponding to the second version number 315-*b* (e.g., in code), the DMS 305 may not trigger a reauthentication procedure, as the DMS 305 is already authenticated for the permission 320-*b* used by the updated backup configuration 310-*b* of the backup application 307.

In some examples, a new feature may be enabled, which may increase the permissions 320-*b* relative to the permissions 320-*a* (and relative to the authenticated permissions 355-*a* associated with the authentication credentials 325-*a*). The new feature may lead to more privileges being utilized by a latest version (e.g., the version number 315-*b*) of the backup application (e.g., the code). In such cases, the additional privileges may trigger a reauthentication procedure. For example, after detecting the update to the backup configuration 310-*b*, the DMS 305 may compare the authenticated permissions 355-*a* to the permission 320-*b* associated with the updated backup configuration 310-*b*. If the permissions 320-*b* are a superset of the permissions of the authenticated permissions 355-*a*, then the DMS 305 may a trigger a reauthentication. As such, the DMS 305 may request the authentication credentials 325-*b* (and may indicate the updated permissions 320-*b*). After receiving the authentication credentials 325-*b* from the user, the DMS 305 may reauthenticate with one or more of the SaaS applications 335 at the client computing system 330, and store the updated permissions, the authentication credentials and the new version number 315-*b* of the backup application 307 in authentication metadata is shown as a mapping between the authentication credentials 325-*b*, authenticated permissions 355-*b*, and authenticated version number 350-*b*.

If the feature gets rolled back or the feature flag or application service provider (ASP) is turned off, the latest version number 315 may change. However, if a feature is rolled back, the DMS 305 may not trigger a reauthentication procedure since the subset of privileges already exists based on the last reauthentication.

Figure 4:
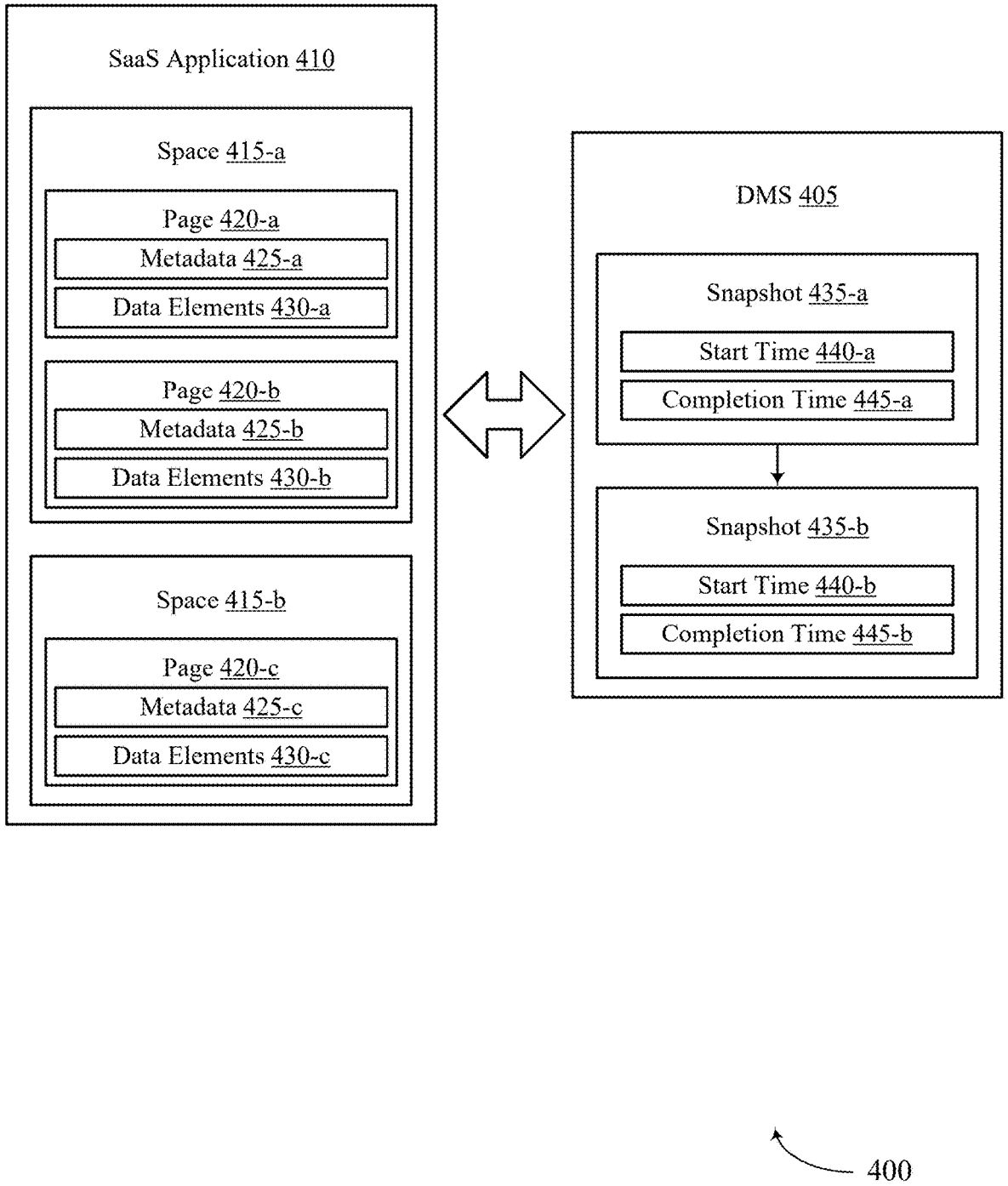
FIG. 4 shows an example of a system diagram that supports backup and recovery for computing objects with hierarchical page structures in accordance with aspects of the present disclosure.

FIG. 4 shows an example of a system diagram 400 that supports backup and recovery for computing objects with hierarchical page structures in accordance with aspects of the present disclosure. The system diagram 400 may implement or be implemented by aspects of the computing environment 100, SaaS application framework 200, or system diagram 300 described with reference to FIGS. 1-3. For example, the system diagram 400 may include a DMS 405, which may be an example of the DMS 110, the DMS 110-*a*, or the DMS 305 as described with reference to FIGS. 1 and 3. An SaaS application 410 may be an example of the SaaS application 255-*b* or the SaaS application 335 as described with reference to FIGS. 2 and 3. The DMS 405 may communicate with the SaaS application 410 to provide backup and recovery services for the SaaS application 410 including a hierarchical page structure.

The SaaS application 410 may host user data in a hierarchical page structure. For example, users of the SaaS application 410 may generate multiple pages 420 for each space 415. A space 415 (e.g., a computing object) may be an example of a folder that corresponds to a particular set of users (e.g., a team, group, organization). The spaces 415 may include or indicate one or more pages 420. For example, a first space 415-*a* may include a first page 420-*a* and a second page 420-*b*, and a second space 415-*b* may include a third page 420-*c*. Each page 420 may include different types of data elements 430 such as text, images, or comments. For example, the first page 420-*a* may include a first set of metadata 425-*a* and a first set of data elements 430-*a*. The second page 420-*b* may include a second set of metadata 425-*b* and a second set of data elements 430-*b*. The third page 420-*c* may include a third set of metadata 425-*c* and a third set of data elements 430-*c*. It may be beneficial for the DMS 405 to support backup and recovery procedures for the hierarchical page structure.

According to techniques described herein, the DMS 405 may support a backup procedure for pages 420 in spaces 415 of an SaaS application 410. The backup procedure may be incremental and resumable via an API of the SaaS application 410 (e.g., REST APIs). For example, the DMS 405 may generate a snapshot 435 including user data stored in the pages 420 of the SaaS application 410 by accessing the API of the SaaS application 410.

The DMS 405 may divide-and-split the backup procedure for the user data stored by the SaaS application 410. The DMS 405 may create different objects in an object hierarchy, where the different objects are individually backed up and together constitute the backup of the user data of the SaaS application 410. For example, the DMS 405 may implement a divide and conquer strategy to provide a robust solution which may be scalable and resilient to failures.

The snappables (e.g., the spaces 415 accessed by the DMS 405) may be identified during a refresh job. The snappables may be added in an object hierarchy (e.g., an Authz object hierarchy), such as the hierarchical data structure 265 of FIG. 2. The DMS 405 may generate one snappable object (e.g., a SaaS application entity 220) per space 415. The DMS 405 may capture each individual space 415 using an API (e.g., REST APIs). The DMS 405 may implement an interface (e.g., SaasObjectIterator interface or SaasPageIterator interface) to capture the spaces 415. For example, the DMS 405 may utilize an iterator included in the interface to iterate through jobs of a taskchain.

The interface may include one or more operations to perform the backup procedure. For example, the interface may implement a get next batch procedure (e.g., GetNextBatch( )). As part of the get next batch procedure, the DMS 405 may make an API call (e.g., a describe API call) to get a list of spaces 415 stored in the user data of the SaaS application 410 (e.g., for an organization). The interface may implement a should perform archival procedure (e.g., ShouldPerformArchival( )). The should perform archival procedure may return true if the backup procedure (e.g., the framework) has objects that have not been archived (e.g., returns true if the framework has not computed objects that are to be archived). For example, the get next batch procedure (e.g., the API call) may return all the objects that are live at the SaaS application 410. The get next batch procedure may return all the spaces 415 or the pages 420 stored at the SaaS application 410. The DMS 405 may compute the difference between the objects that are live at the SaaS application 410 and the objects stored at the DMS 405. For example, the DMS 405 may determine if one or more spaces 415 or one or more pages 420 are stored at the SaaS application, but not stored at the DMS 405. If there is no difference between the objects stored at the DMS 405 and the objects stored at the SaaS application 410, the should perform archival procedure may return false, and the DMS 405 may not perform a backup procedure. If there is a difference between the objects stored at the DMS 405 and the objects stored at the SaaS application 410, the should perform archival procedure may return true, and the DMS 405 may perform a backup procedure.

The backup may be built on top of an SaaS backup framework. The DMS 405 may include a job manager. The DMS 405 may utilize a same job manager for multiple SaaS applications 410. The job manager may spawn instances of jobs which executes a taskchain. The taskchain may launch an exotask with an input configuration, and the taskchain may monitor the exotask. The exotask may identify entities of the snappable for which this backup job was launched, and the exotask may executes the backup of those entities. For example, the DMS 405 may launch one or more exotasks corresponding to one or more spaces 415 or one or more pages 420. The one or more exotasks may perform a backup procedure for the corresponding one or more spaces 415 or the one or more pages 420.

Across snapshots 435 for the pages 420, the DMS 405 may backup the pages 420 in a specific structured schema format that may be independent of a storage format at a source (e.g., an application provider or organization associated with the SaaS application 410). Being independent of the source storage enables the DMS 405 to be independent of changes from the source (e.g., backend changes made by the SaaS application 410). The independence may make the backup solution robust.

The DMS 405 (e.g., an entity of the SaaS application 410) may backup the pages 420 in a space 415. The DMS 405 may use a schema to store the pages 420 in the database (e.g., a database managed or accessed by the DMS 405) for each space 415. The schema (e.g., a Page struct) may include one or more parameters. The one or more parameters may include an identifier (e.g., ID string 'ColumnID: "1" DB: "text" Index: "key"'), a title (e.g., Title string 'ColumnID: "2" DB: "text"'), a space key for the space 415 (SpaceKey string 'ColumnID: "5" DB: "text" Index: "true"'), and the contents of the page 420 (e.g., BodyStorage types. BlobColumnType 'ColumnID: "4"') The column elements may be indicative of which column the corresponding elements are stored in a database table.

The DMS 405 may store the metadata of the space 415 (e.g., the ID, the title, and the key). The DMS 405 may store the entire data of a page 420 (e.g., the data elements) in a binary large objects (BLOB) object (e.g., 'BodyStorage' blob), which may be referenced (e.g., identified by) value in the corresponding column of the database table.

The DMS 405 may backup multiple pages 420 (e.g., all pages) from user data stored by the SaaS application 410. Each page 420 may be stored as a record in a database. The SaaS application may provide space level backups and restores for a limited period, while the DMS 405 may enable the users to do row-level recovery (e.g., page level recovery) for any historical time.

An initial backup (e.g., a first snapshot 435-*a*) stored at the DMS 405 may be a full snapshot or backup. Subsequent backups (e.g., the second snapshot 435-*b*) may be incremental snapshots or backups (e.g., first full). The incremental snapshots for the hierarchical page structure may improve backup efficiency, decrease resource utilization, and support shorter service level agreements (SLAs).

The backup procedure may backup the pages 420 present in the space 415 as per the schema. For example, the backup procedure may backup the first page 420-*a* and the second page 420-*b* in the first space 415-*a*. The first snapshot 435-*a* may be a full snapshot, following snapshots (e.g., the second snapshot 435-*b*) may be incremental snapshots. After the first snapshot 435-*a*, in each incremental snapshot 435, the DMS 405 may process pages 420 which were added, deleted, or modified since the last snapshot was taken (e.g., since a completion time 445-*a* of the first snapshot 435-*a*).

The DMS 405 may write a synchronization token with each snapshot which may be used as a start token for the next snapshot. The synchronization token (e.g., message PageSyncToken) may represent the entity token for a page entity.

The synchronization token may include a next indicator (e.g., string next=1) which defines a next universal resource locator (URL) obtained from a hypertext transfer protocol (HTTP) response of a CQL query. The DMS 405 may use the next indicator to fetch the next page. The synchronization token may include a start time 440 (e.g., string query_start_time_utc=2) associated with the snapshot 435. The start time 440 may represent a universal time coordinated (UTC) time, and the start time 440 may be a starting point of time bounded by a search query. A format of the start time 440 may be YYYY-MM-DD HH: MM.

The synchronization token may include a completion time 445 (e.g., string query_end_time_utc=3). The completion time 445 may be a UTC time, the completion time 445 may be an ending point of time bounded by a search query. A time search space associated with the snapshot 435 may be between the start time 440 and the completion time 445 (e.g., [query_start_time_utc, query_end_time_utc]). The time search space may be inclusive. A format of the completion time 445 may be YYYY-MM-DD HH: MM.

The start time 440 and completion time 445 (e.g., end time) in the synchronization token may define the range of time in which any pages modified will be backup in the snapshot 435. For the first full snapshot 435-*a*, the start time 440-*a* may be empty (e.g., zero) and the completion time 445-*a* may be the time of the first snapshot 435-*a*.

The synchronization token may be also used for resumability of a full snapshot 435 (e.g., the first full snapshot 435-*a*). For example, if a full snapshot 435 fails in between, a next run may continue from where a previous run left off. The reusability may be enabled using the next indicator (e.g., next URL) which may indicate to the DMS 405 where to start backing up on resuming. To get the pages 420, the DMS may utilize an API of the SaaS application 410 (e.g., CQL REST API).

The backup procedure performed by the DMS 405 may be fully resumable from any point of crash. The DMS 405 may not have to redo the backups (e.g., already completed backups of pages 420). The backup resumability may increase the backup efficiency and decrease resource utilization after an uncontrollable failure.

The DMS 405 may fetch updated pages 420 from the SaaS application 410 using the API as described herein. The start time 440-*b* of the incremental snapshot 435-*b* (e.g., in the synchronization token) may be the completion time 445-*a* of the previous snapshot 435-*a* and the completion time 445-*b* may be a current time of the incremental snapshot 435-*b*. To get the pages incrementally, the DMS 405 may use an API (e.g., the CQL REST API). For example, the DMS 405 may output an API call indicating the start time 440-*b*, and the DMS 405 may obtain a list of pages 420 that have been modified since the start time 440-*b*.

The DMS 405 may implement error handling for the backup procedure. In some examples, the DMS 405 may retry logic in a software development kit (SDK) for source errors. In some examples, the DMS 405 may retry logic in a backup framework for Zeus errors. In some examples, the DMS 405 may skip items (e.g., spaces 415 or pages 420) in the backup framework for some records.

The DMS 405 may implement job resumability via periodic synchronization in Zeus after an entity backup, during an entity backup, or after a quantity of pages 420 (e.g., N pages). The periodic synchronization may be described or defined in the backup framework.

Figure 5:
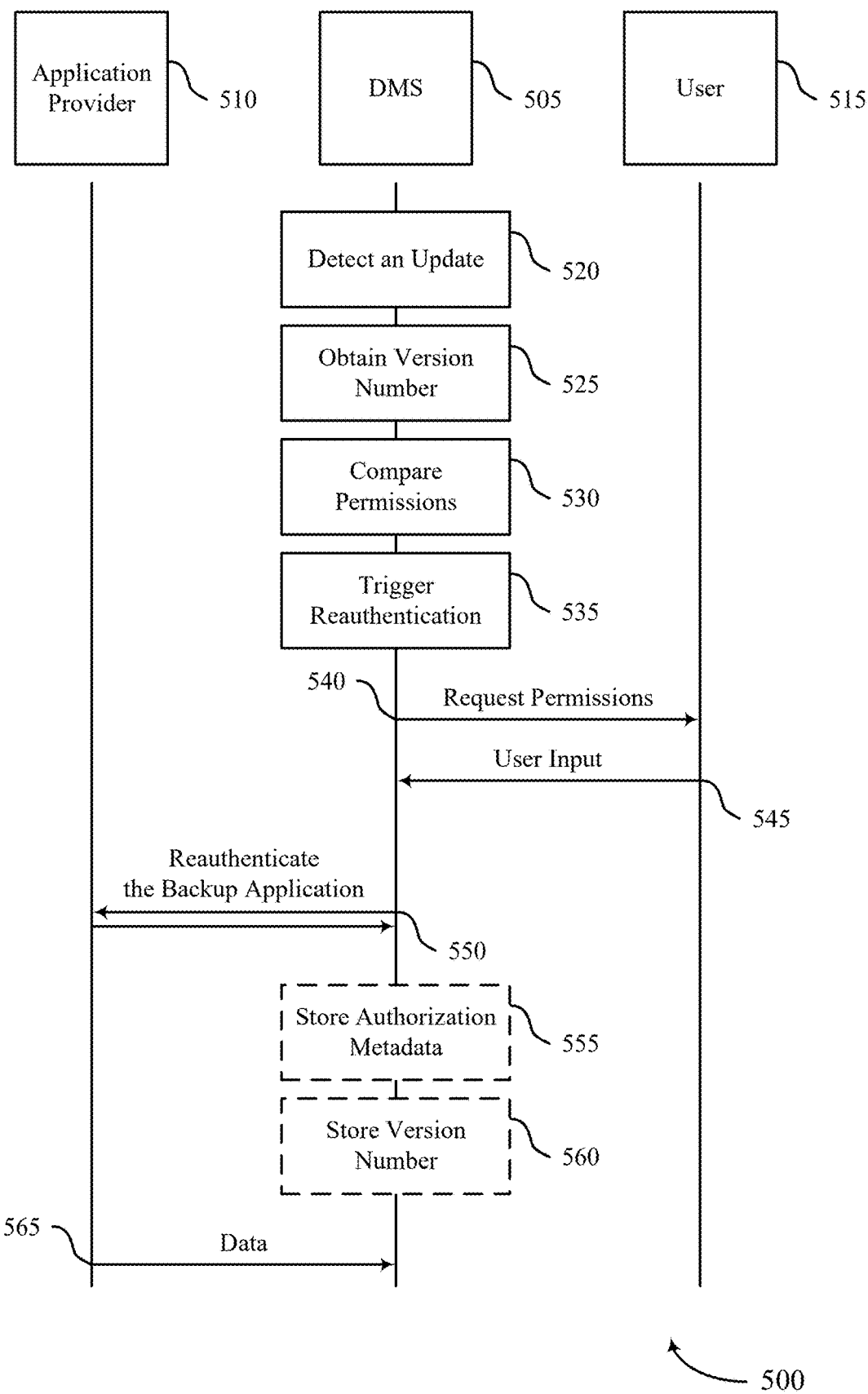
FIG. 5 shows an example of a process flow that supports backup and recovery for computing objects with hierarchical page structures in accordance with aspects of the present disclosure.

FIG. 5 shows an example of a process flow 500 that supports backup and recovery for computing objects with hierarchical page structures in accordance with aspects of the present disclosure. The process flow 500 may implement or be implemented by aspects of FIGS. 1-4. For example, the process flow 500 may include a DMS 505, an application provider 510, or a user 515, which may be an example of corresponding devices described herein as descried with reference to FIGS. 1-4. In the following description of the process flow 500, operations between the DMS 505, the application provider 510, and the user 515 may be added, omitted, or performed in a different order (with respect to the exemplary order shown). The DMS 505 may provide backup or recovery services for user data store by one or more SaaS application provided by the application provider 510.

At 520, the DMS 505 may detect an update to one or more backup configurations for a backup application supported by the DMS 505. The backup application may be configured to support backup of multiple SaaS applications that are accessible via a set of authentication credentials for a client of the DMS. The update may result in an updated target version number for the backup application. The set of authentication credentials for the client of the DMS may be associated with the application provider 510 (e.g., a single application provider).

In some cases, the update may include an addition of a SaaS application of the multiple SaaS applications that the backup application is configured to support for the client. In some cases, the update may include a change to one or more backup or recovery services provided by the backup application supported by the DMS.

At 525, the DMS 505 may obtain an authenticated version number for the backup application associated with a previous authentication of the backup application to at least one of the multiple SaaS applications. The authenticated version number may be dependent on whether the previous authentication of the backup application was to a single SaaS application from among the multiple SaaS applications or a combination of multiple software as-as-service applications from among the multiple SaaS applications.

At 530, the DMS 505 may compare a first set of authenticated permissions associated with the authenticated version number to a second set of permissions associated with the update to the one or more backup configurations for the backup application.

In some cases, the DMS 505 may compare a first permission scope of the first set of authenticated permissions to a second permission scope of the second set of permissions. The first permission scope may be based on the authenticated version number being associated with a first quantity of SaaS application of the multiple SaaS applications. The second permission scope may be based on the updated target version number being associated with a second quantity of SaaS applications of the multiple SaaS applications. The second set of permissions may include one or more latest available permissions used by the backup application.

At 535, the DMS 505 may trigger, in accordance with a result of the comparing, a reauthentication of the backup application to one or more SaaS applications of the multiple SaaS applications. In some cases, the reauthentication is triggered in accordance with the addition of the SaaS application. In some cases, the reauthentication may be triggered in accordance with the change to the one or more backup or recovery services provided by the backup application.

In some cases, triggering the reauthentication may be based on the second permission scope being greater than the first permission scope. For example, the reauthentication may be triggered in accordance with the second quantity of SaaS application being a superset of the first quantity of SaaS applications. Additionally, or alternatively, the reauthentication may be triggered based on the second permission scope including one or more permission that are not included in the first set of permissions of the first permission scope. For example, the second set of permissions may be based on one or more additional backup/recovery services being added for the updated backup configuration.

At 540, the DMS 505 may output a request for the user 515 to authenticate the second set of permissions. At 545, the DMS 505 may receive, at the DMS in accordance with the reauthentication, one or more user inputs indicative of the set of authentication credentials.

At 550, the DMS 505 may reauthenticate the backup application to the one or more SaaS applications using the set of authentication credentials. For example, the DMS 505 may output the authentication credentials to the application provider 510.

At 555, the DMS 505 may store authorization metadata include a client identifier of the client, a first indication of an authorizing user associated with the client, a second indication of the application provider 510, a third indication of the set of authentication credentials, a primary key, or any combination thereof.

At 560, the DMS 505 may store, after reauthenticating the backup application, the updated target version number in association with a client identifier for the client and an indication of the one or more SaaS applications to which the backup application is authenticated as a result of the reauthentication. The updated target version number may be used as the authenticated version number for a subsequent update to at least one backup configuration for the backup application.

At 565, the DMS 505 may obtain, after reauthenticating the backup application, data from the one or more SaaS applications in accordance with the one or more backup configurations.

In some cases, the multiple SaaS applications that the backup application is configured to support are associated with a single application provider 510. The one or more SaaS applications may be a subset of the multiple SaaS applications that are associated with the single application provider 510.

In some cases, the DMS 505 may detect, after reauthenticating the backup application, a second update to the one or more backup configurations for the backup application supported by the DMS. The DMS 505 may refrain from performing a second reauthentication based on the second set of permissions being a superset of a third set of permissions associated with the second update to the one or more backup configurations for the backup application.

Figure 6:
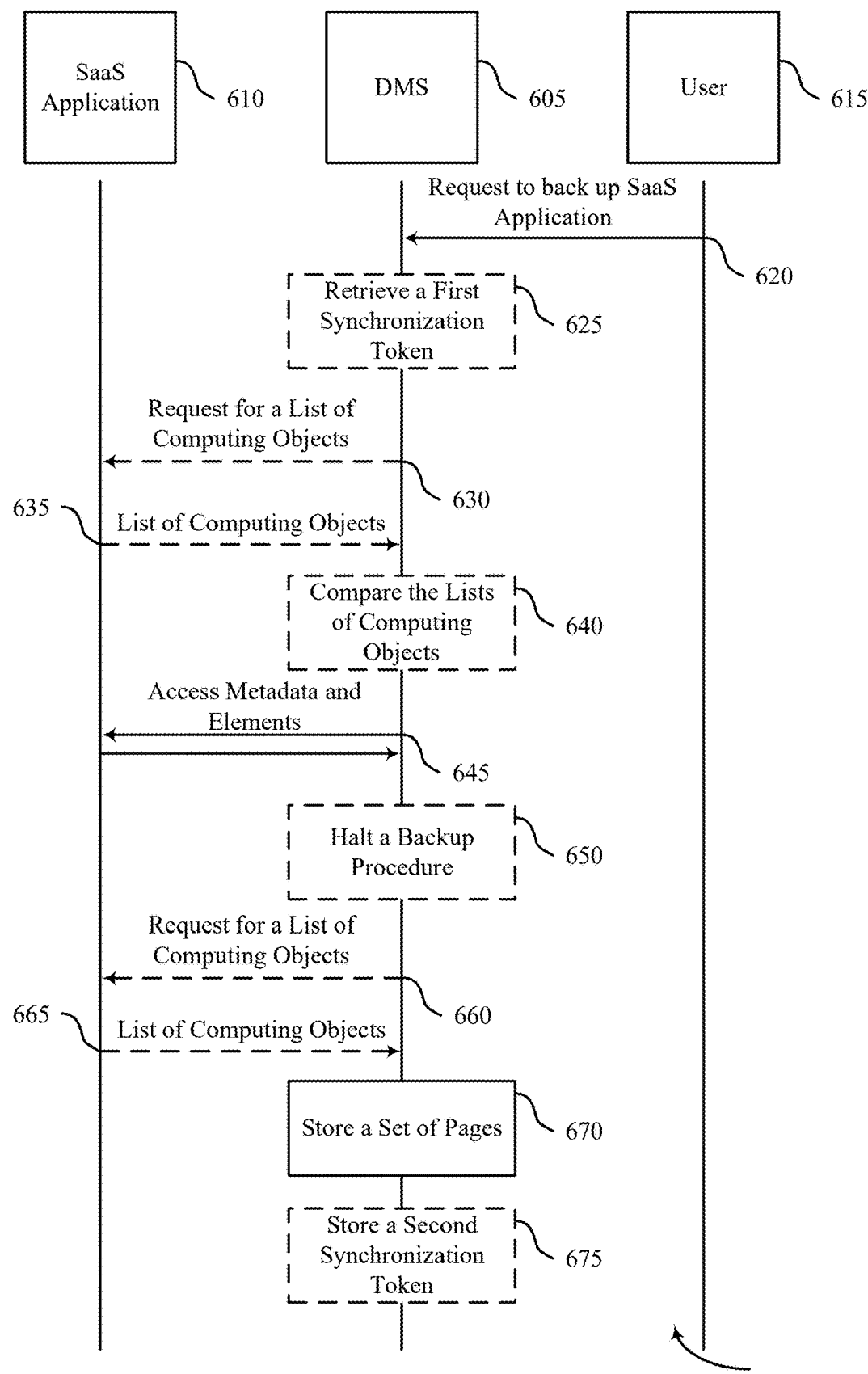
FIG. 6 shows an example of a process flow that supports backup and recovery for computing objects with hierarchical page structures in accordance with aspects of the present disclosure.

FIG. 6 shows an example of a process flow 600 that supports backup and recovery for computing objects with hierarchical page structures in accordance with aspects of the present disclosure. The process flow 600 may implement or be implemented by aspects of FIGS. 1-5. For example, the process flow 600 may include a DMS 605, an SaaS application 610, or a user 615, which may be an example of corresponding devices described herein as descried with reference to FIGS. 1-5. In the following description of the process flow 600, operations between the DMS 605, the SaaS application 610, and the user 615 may be added, omitted, or performed in a different order (with respect to the exemplary order shown). The DMS 605 may provide backup and recovery services for user data stored by an SaaS application including a hierarchical page structure.

At 620, the DMS 605 may receive a request to back up the SaaS application 610 including a set of computing objects. The computing objects within the set of computing objects may include respective sets of pages. Pages within the respective sets of pages may include respective sets of data elements and respective sets of metadata. The request may be received based on a request from a user or based on a backup schedule configuration (e.g., a SLA).

At 625, the DMS 605 may retrieve a first synchronization token associated with a second snapshot prior to a first snapshot. The first synchronization token may indicate a first start time and a first completion time associated with the second snapshot.

At 630, the DMS 605 may output, via the API, a request for a list of computing objects within the set of computing objects or a first list of pages within the first computing object. In some cases, the DMS 605 may output, via the API, a request for a list of pages within the first computing object that have changed since the first completion time.

At 635, the DMS may obtain the list of computing objects. In some cases, the DMS 605 may obtain, in response to the request, an indication of the first set of pages that have changed since the first completion time. In some cases, the DMS 605 may obtain, in response to the request, an indication of the first set of pages.

At 640, the DMS 605 may compare a list of computing objects and a current set of computing objects backed up by the DMS.

At 645, the DMS 605 may access (e.g., and receive), based on the request and via an API for the SaaS application, first sets of metadata and first sets of data elements of a first set of pages included in a first computing object to obtain the first snapshot of the first computing object. The first snapshot may be an incremental snapshot dependent on a previous snapshot.

In some cases, the DMS 605 may access the first sets of metadata and the first sets of data elements of the first set of pages in the first computing object based on the list of computing objects being different than the current set of computing objects. In some cases, the DMS 605 may access the first sets of metadata and the first sets of data elements of the first set of pages based on obtaining the indication of the first set of pages. In some cases, the DMS 605 may access at least a subset of the first sets of metadata and at least a subset of the first sets of data elements of the first set of pages based on obtaining the indication of the first set of pages.

At 650, the DMS 605 may halt a backup procedure of the first set of pages. A completion time associated with the first snapshot may be based on halting the backup procedure. Thus, the DMS 605 may store the completion time based on halting the backup procedure.

At 660, the DMS 605 may output, via the API after halting the backup procedure, a second request for a second list of pages within the first computing object that have changed since the completion time.

At 665, the DMS 605 may obtain, in response to the second request an indication of remaining pages in the first set of pages. The remaining first sets of metadata and remaining first sets of data elements may be accessed using the indication of the remaining pages in the first set of pages.

At 670, the DMS 605 may store, for each page in the first set of pages included in the first computing object, a respective first set of metadata in one or more first fields of a respective page structure defined by a page schema at the DMS and a respective first set of data elements in a second field of the respective page structure defined by the page schema. Storing the first sets of metadata and the first sets of data elements in respective page structures defined by the page schema may result in obtainment of the first snapshot of the first computing object.

In some cases, the respective first set of metadata may include a first page identifier for the page, a first page title of the page, a key associated with the first computing object, or any combination thereof. In some cases, the DMS 605 may store the respective first set of data elements in a binary large object (BLOB) data store. The DMS 605 may store, in the second field of the respective page structure, an identifier for the respective first set of data elements as stored in the BLOB data store.

At 675, the DMS 605 may store a second synchronization token indicative of a second start time and a second completion time associated with the first snapshot. The second start time may be the first completion time, and the second completion time may be a current time associated with the obtainment of the first snapshot.

Figure 7:
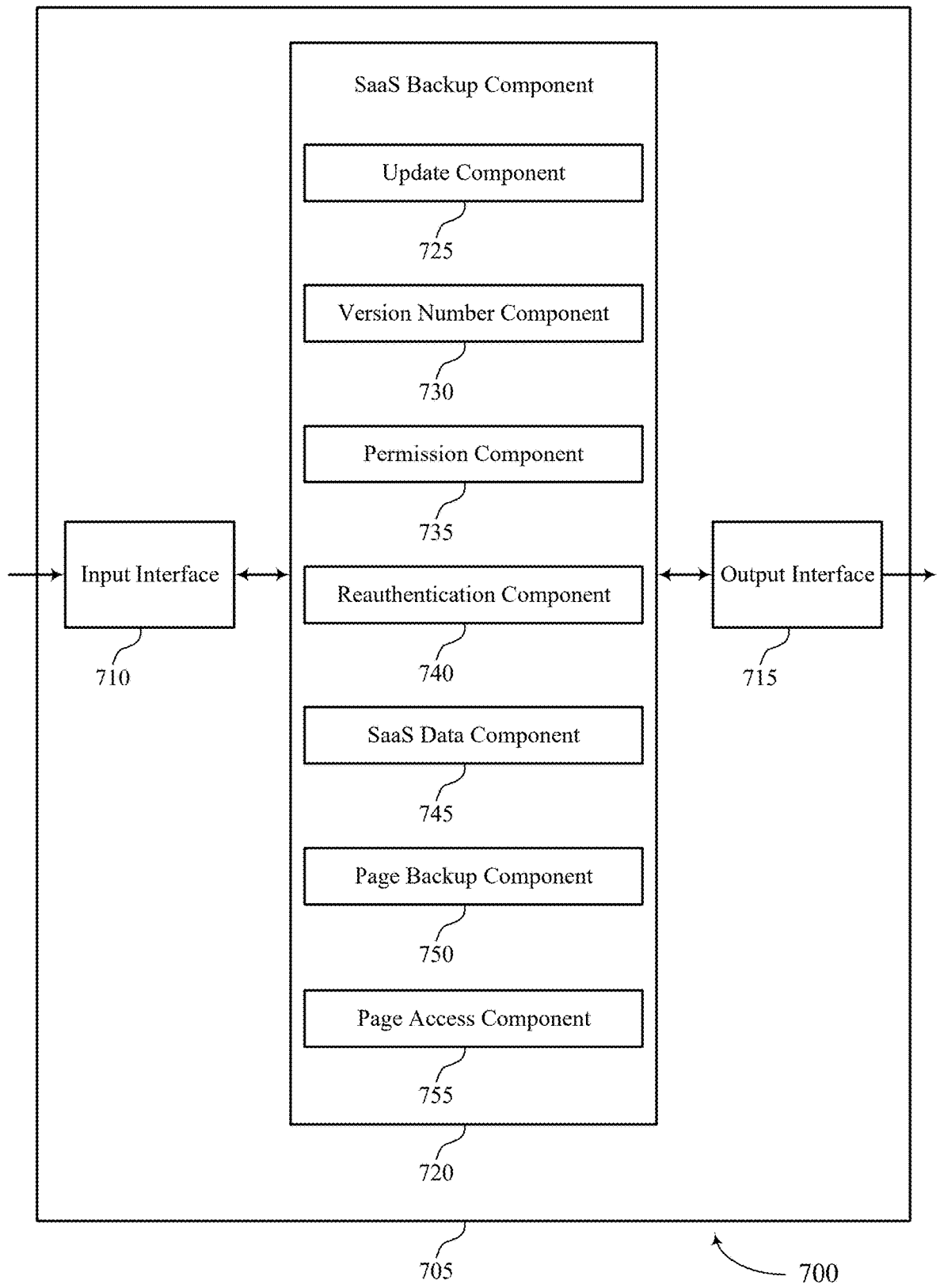
FIG. 7 shows a block diagram of an apparatus that supports backup and recovery for computing objects with hierarchical page structures in accordance with aspects of the present disclosure.

FIG. 7 shows a block diagram 700 of a system 705 that supports backup and recovery for computing objects with hierarchical page structures in accordance with aspects of the present disclosure. In some examples, the system 705 may be an example of aspects of one or more components described with reference to FIG. 1, such as a DMS 110. The system 705 may include an input interface 710, an output interface 715, and a SaaS backup component 720. The system 705 may also include one or more processors. Each of these components may be in communication with one another (e.g., via one or more buses, communications links, communications interfaces, or any combination thereof).

The input interface 710 may manage input signaling for the system 705. For example, the input interface 710 may receive input signaling (e.g., messages, packets, data, instructions, commands, or any other form of encoded information) from other systems or devices. The input interface 710 may send signaling corresponding to (e.g., representative of or otherwise based on) such input signaling to other components of the system 705 for processing. For example, the input interface 710 may transmit such corresponding signaling to the SaaS backup component 720 to support reauthentication of a DMS for multiple applications associated with common credentials and backup and recovery for computing objects with hierarchical page structures. In some cases, the input interface 710 may be a component of a network interface 925 as described with reference to FIG. 9.

The output interface 715 may manage output signaling for the system 705. For example, the output interface 715 may receive signaling from other components of the system 705, such as the SaaS backup component 720, and may transmit such output signaling corresponding to (e.g., representative of or otherwise based on) such signaling to other systems or devices. In some cases, the output interface 715 may be a component of a network interface 925 as described with reference to FIG. 9.

For example, the SaaS backup component 720 may include an update component 725, a version number component 730, a permission component 735, a reauthentication component 740, a SaaS data component 745, a page backup component 750, a page access component 755, or any combination thereof. In some examples, the SaaS backup component 720, or various components thereof, may be configured to perform various operations (e.g., receiving, monitoring, transmitting) using or otherwise in cooperation with the input interface 710, the output interface 715, or both. For example, the SaaS backup component 720 may receive information from the input interface 710, send information to the output interface 715, or be integrated in combination with the input interface 710, the output interface 715, or both to receive information, transmit information, or perform various other operations as described herein.

The update component 725 may be configured as or otherwise support a means for detecting an update to one or more backup configurations for a backup application supported by a DMS, where the backup application is configured to support backup of a set of multiple SaaS applications that are accessible via a set of authentication credentials for a client of the DMS, the update resulting in an updated target version number for the backup application. The version number component 730 may be configured as or otherwise support a means for obtaining an authenticated version number for the backup application associated with a previous authentication of the backup application to at least one of the set of multiple SaaS applications, where the authenticated version number is dependent on whether the previous authentication of the backup application was to a single SaaS application from among the set of multiple SaaS applications or a combination of multiple software as-a-service applications from among the set of multiple SaaS applications. The permission component 735 may be configured as or otherwise support a means for comparing a first set of authenticated permissions associated with the authenticated version number to a second set of permissions associated with the update to the one or more backup configurations for the backup application. The reauthentication component 740 may be configured as or otherwise support a means for triggering, in accordance with a result of the comparing, a reauthentication of the backup application to one or more SaaS applications of the set of multiple SaaS applications. The reauthentication component 740 may be configured as or otherwise support a means for receiving, at the DMS in accordance with the reauthentication, one or more user inputs indicative of the set of authentication credentials. The reauthentication component 740 may be configured as or otherwise support a means for reauthenticating the backup application to the one or more SaaS applications using the set of authentication credentials. The SaaS data component 745 may be configured as or otherwise support a means for obtaining, after reauthenticating the backup application, data from the one or more SaaS applications in accordance with the one or more backup configurations.

The page backup component 750 may be configured as or otherwise support a means for receiving, by a DMS, a request to back up a SaaS application including a set of computing objects, where computing objects within the set of computing objects include respective sets of pages, and where pages within the respective sets of pages include respective sets of data elements and respective sets of metadata. The page access component 755 may be configured as or otherwise support a means for accessing, by the DMS based on the request and via an API for the SaaS application, first sets of metadata and first sets of data elements of a first set of pages included in a first computing object to obtain a first snapshot of the first computing object. The page backup component 750 may be configured as or otherwise support a means for storing, for each page in the first set of pages included in the first computing object, a respective first set of metadata in one or more first fields of a respective page structure defined by a page schema at the DMS and a respective first set of data elements in a second field of the respective page structure defined by the page schema, where storing the first sets of metadata and the first sets of data elements in respective page structures defined by the page schema results in obtainment of the first snapshot of the first computing object.

Figure 8:
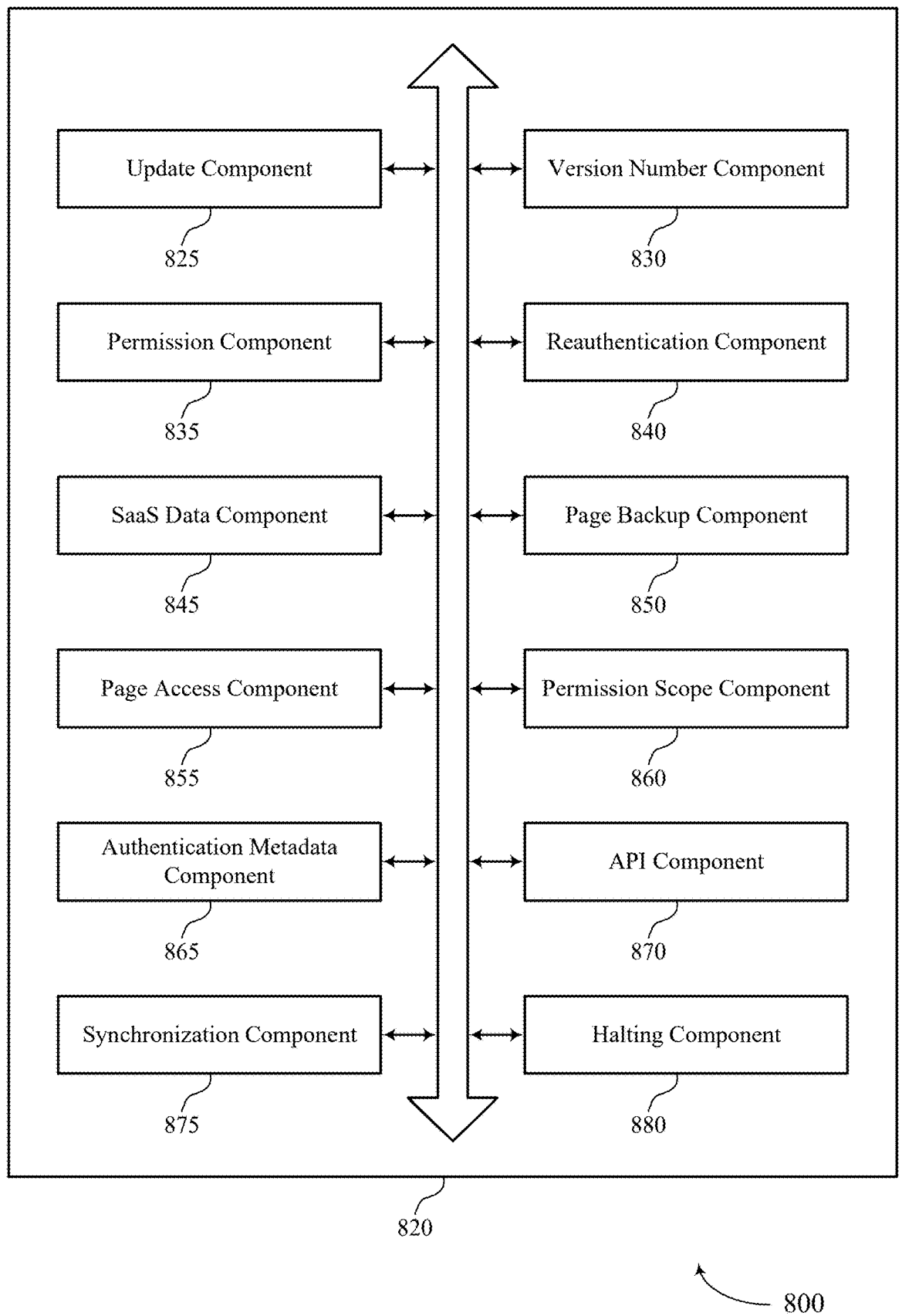
FIG. 8 shows a block diagram of a SaaS backup component that supports backup and recovery for computing objects with hierarchical page structures in accordance with aspects of the present disclosure.

FIG. 8 shows a block diagram 800 of a SaaS backup component 820 that supports backup and recovery for computing objects with hierarchical page structures in accordance with aspects of the present disclosure. The SaaS backup component 820 may be an example of aspects of a SaaS backup component or a SaaS backup component 720, or both, as described herein. The SaaS backup component 820, or various components thereof, may be an example of means for performing various aspects of backup and recovery for computing objects with hierarchical page structures as described herein. For example, the SaaS backup component 820 may include an update component 825, a version number component 830, a permission component 835, a reauthentication component 840, a SaaS data component 845, a page backup component 850, a page access component 855, a permission scope component 860, an authentication metadata component 865, an API component 870, a synchronization component 875, a halting component 880, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The update component 825 may be configured as or otherwise support a means for detecting an update to one or more backup configurations for a backup application supported by a DMS, where the backup application is configured to support backup of a set of multiple SaaS applications that are accessible via a set of authentication credentials for a client of the DMS, the update resulting in an updated target version number for the backup application. The version number component 830 may be configured as or otherwise support a means for obtaining an authenticated version number for the backup application associated with a previous authentication of the backup application to at least one of the set of multiple SaaS applications, where the authenticated version number is dependent on whether the previous authentication of the backup application was to a single SaaS application from among the set of multiple SaaS applications or a combination of multiple software as-a-service applications from among the set of multiple SaaS applications. The permission component 835 may be configured as or otherwise support a means for comparing a first set of authenticated permissions associated with the authenticated version number to a second set of permissions associated with the update to the one or more backup configurations for the backup application. The reauthentication component 840 may be configured as or otherwise support a means for triggering, in accordance with a result of the comparing, a reauthentication of the backup application to one or more SaaS applications of the set of multiple SaaS applications. In some examples, the reauthentication component 840 may be configured as or otherwise support a means for receiving, at the DMS in accordance with the reauthentication, one or more user inputs indicative of the set of authentication credentials. In some examples, the reauthentication component 840 may be configured as or otherwise support a means for reauthenticating the backup application to the one or more SaaS applications using the set of authentication credentials. The SaaS data component 845 may be configured as or otherwise support a means for obtaining, after reauthenticating the backup application, data from the one or more SaaS applications in accordance with the one or more backup configurations.

In some examples, to support comparing the first set of authenticated permissions to the second set of permissions, the permission scope component 860 may be configured as or otherwise support a means for comparing a first permission scope of the first set of authenticated permissions to a second permission scope of the second set of permissions, where triggering the reauthentication is based on the second permission scope being greater than the first permission scope.

In some examples, the first permission scope is based on the authenticated version number being associated with a first quantity of SaaS application of the set of multiple SaaS applications, and the second permission scope is based on the updated target version number being associated with a second quantity of SaaS applications of the set of multiple SaaS applications. In some examples, the reauthentication is triggered in accordance with the second quantity being a superset of the first quantity.

In some examples, the update component 825 may be configured as or otherwise support a means for detecting, after reauthenticating the backup application, a second update to the one or more backup configurations for the backup application supported by the DMS. In some examples, the reauthentication component 840 may be configured as or otherwise support a means for refraining from performing a second reauthentication based on the second set of permissions being a superset of a third set of permissions associated with the second update to the one or more backup configurations for the backup application.

In some examples, the update includes an addition of a SaaS application of the set of multiple SaaS applications that the backup application is configured to support for the client. In some examples, the reauthentication is triggered in accordance with the addition of the SaaS application.

In some examples, the update includes a change to one or more backup or recovery services provided by the backup application supported by the DMS. In some examples, the reauthentication is triggered in accordance with the change to the one or more backup or recovery services provided by the backup application.

In some examples, the set of multiple SaaS applications that the backup application is configured to support are associated with a single application provider, and the one or more SaaS applications are a subset of the set of multiple SaaS applications that are associated with the single application provider.

In some examples, to support reauthenticating the backup application, the authentication metadata component 865 may be configured as or otherwise support a means for storing authorization metadata including a client identifier of the client, a first indication of an authorizing user associated with the client, a second indication of an application provider, a third indication of the set of authentication credentials, a primary key, or any combination thereof.

In some examples, the set of authentication credentials for the client of the DMS are associated with a single application provider.

In some examples, the authentication metadata component 865 may be configured as or otherwise support a means for storing, after reauthenticating the backup application, the updated target version number in association with a client identifier for the client and an indication of the one or more SaaS applications to which the backup application is authenticated as a result of the reauthentication, where the updated target version number is used as the authenticated version number for a subsequent update to at least one backup configuration for the backup application.

In some examples, the second set of permissions includes one or more latest available permissions used by the backup application.

The page backup component 850 may be configured as or otherwise support a means for receiving, by a DMS, a request to back up a SaaS application including a set of computing objects, where computing objects within the set of computing objects include respective sets of pages, and where pages within the respective sets of pages include respective sets of data elements and respective sets of metadata. The page access component 855 may be configured as or otherwise support a means for accessing, by the DMS based on the request and via an API for the SaaS application, first sets of metadata and first sets of data elements of a first set of pages included in a first computing object to obtain a first snapshot of the first computing object. In some examples, the page backup component 850 may be configured as or otherwise support a means for storing, for each page in the first set of pages included in the first computing object, a respective first set of metadata in one or more first fields of a respective page structure defined by a page schema at the DMS and a respective first set of data elements in a second field of the respective page structure defined by the page schema, where storing the first sets of metadata and the first sets of data elements in respective page structures defined by the page schema results in obtainment of the first snapshot of the first computing object.

In some examples, the API component 870 may be configured as or otherwise support a means for outputting, via the API, a request for a list of computing objects within the set of computing objects. In some examples, the page backup component 850 may be configured as or otherwise support a means for comparing the list of computing objects and a current set of computing objects backed up by the DMS, where accessing the first sets of metadata and the first sets of data elements of the first set of pages in the first computing object is based on the list of computing objects being different than the current set of computing objects.

In some examples, to support accessing the first sets of metadata and the first sets of data elements of the first set of pages, the synchronization component 875 may be configured as or otherwise support a means for retrieving a first synchronization token associated with a second snapshot prior to the first snapshot, where the first synchronization token indicates a first start time and a first completion time associated with the second snapshot. In some examples, to support accessing the first sets of metadata and the first sets of data elements of the first set of pages, the API component 870 may be configured as or otherwise support a means for outputting, via the API, a request for a list of pages within the first computing object that have changed since the first completion time. In some examples, to support accessing the first sets of metadata and the first sets of data elements of the first set of pages, the API component 870 may be configured as or otherwise support a means for obtaining, in response to the request, an indication of the first set of pages that have changed since the first completion time, where accessing the first sets of metadata and the first sets of data elements of the first set of pages is based on obtaining the indication of the first set of pages. In some examples, to support accessing the first sets of metadata and the first sets of data elements of the first set of pages, the synchronization component 875 may be configured as or otherwise support a means for storing a second synchronization token indicative of a second start time and a second completion time associated with the first snapshot.

In some examples, the second start time is the first completion time, and the second completion time is a current time associated with the obtainment of the first snapshot.

In some examples, to support accessing the first sets of metadata and the first sets of data elements of the first set of pages, the API component 870 may be configured as or otherwise support a means for outputting, via the API, a request for a first list of pages within the first computing object. In some examples, to support accessing the first sets of metadata and the first sets of data elements of the first set of pages, the page backup component 850 may be configured as or otherwise support a means for obtaining, in response to the request, an indication of the first set of pages, where accessing at least a subset of the first sets of metadata and at least a subset of the first sets of data elements of the first set of pages is based on obtaining the indication of the first set of pages.

In some examples, the halting component 880 may be configured as or otherwise support a means for halting a backup procedure of the first set of pages, where a completion time associated with the first snapshot is based on halting the backup procedure.

In some examples, the API component 870 may be configured as or otherwise support a means for outputting, via the API after halting the backup procedure, a second request for a second list of pages within the first computing object that have changed since the completion time. In some examples, the page backup component 850 may be configured as or otherwise support a means for obtaining, in response to the second request an indication of remaining pages in the first set of pages, and where remaining first sets of metadata and remaining first sets of data elements are accessed using the indication of the remaining pages in the first set of pages.

In some examples, the respective first set of metadata includes a first page identifier for the page, a first page title of the page, a key associated with the first computing object, or any combination thereof.

In some examples, to support storing the respective first set of data elements in the second field, the page backup component 850 may be configured as or otherwise support a means for storing the respective first set of data elements in a binary large object (BLOB) data store. In some examples, to support storing the respective first set of data elements in the second field, the page backup component 850 may be configured as or otherwise support a means for storing, in the second field of the respective page structure, an identifier for the respective first set of data elements as stored in the BLOB data store.

In some examples, the first snapshot is an incremental snapshot dependent on a previous snapshot.

Figure 9:
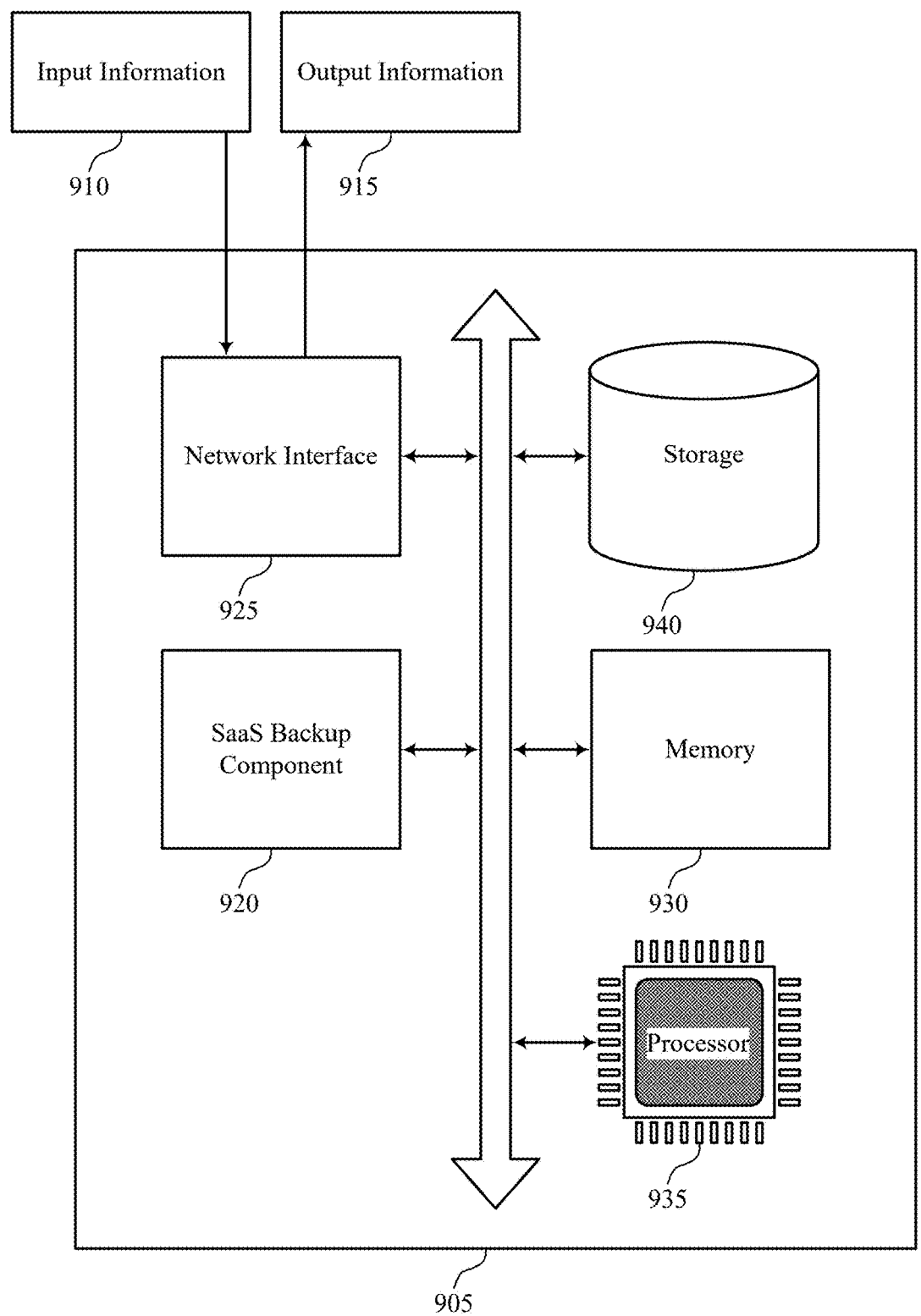
FIG. 9 shows a diagram of a system including a device that supports backup and recovery for computing objects with hierarchical page structures in accordance with aspects of the present disclosure.

FIG. 9 shows a block diagram 900 of a system 905 that supports backup and recovery for computing objects with hierarchical page structures in accordance with aspects of the present disclosure. The system 905 may be an example of or include components of a system 705 as described herein. The system 905 may include components for data management, including components such as a SaaS backup component 920, an input information 910, an output information 915, a network interface 925, at least one memory 930, at least one processor 935, and a storage 940. These components may be in electronic communication or otherwise coupled with each other (e.g., operatively, communicatively, functionally, electronically, electrically; via one or more buses, communications links, communications interfaces, or any combination thereof). Additionally, the components of the system 905 may include corresponding physical components or may be implemented as corresponding virtual components (e.g., components of one or more virtual machines). In some examples, the system 905 may be an example of aspects of one or more components described with reference to FIG. 1, such as a DMS 110.

The network interface 925 may enable the system 905 to exchange information (e.g., input information 910, output information 915, or both) with other systems or devices (not shown). For example, the network interface 925 may enable the system 905 to connect to a network (e.g., a network 120 as described herein). The network interface 925 may include one or more wireless network interfaces, one or more wired network interfaces, or any combination thereof. In some examples, the network interface 925 may be an example of may be an example of aspects of one or more components described with reference to FIG. 1, such as one or more network interfaces 165.

Memory 930 may include RAM, ROM, or both. The memory 930 may store computer-readable, computer-executable software including instructions that, when executed, cause the processor 935 to perform various functions described herein. In some cases, the memory 930 may contain, among other things, a basic input/output system (BIOS), which may control basic hardware or software operation such as the interaction with peripheral components or devices. In some cases, the memory 930 may be an example of aspects of one or more components described with reference to FIG. 1, such as one or more memories 175.

The processor 935 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 935 may be configured to execute computer-readable instructions stored in a memory 930 to perform various functions (e.g., functions or tasks supporting reauthentication of a DMS for multiple applications associated with common credentials and backup and recovery for computing objects with hierarchical page structures). Though a single processor 935 is depicted in the example of FIG. 9, it is to be understood that the system 905 may include any quantity of one or more of processors 935 and that a group of processors 935 may collectively perform one or more functions ascribed herein to a processor, such as the processor 935. In some cases, the processor 935 may be an example of aspects of one or more components described with reference to FIG. 1, such as one or more processors 170.

Storage 940 may be configured to store data that is generated, processed, stored, or otherwise used by the system 905. In some cases, the storage 940 may include one or more HDDs, one or more SDDs, or both. In some examples, the storage 940 may be an example of a single database, a distributed database, multiple distributed databases, a data store, a data lake, or an emergency backup database. In some examples, the storage 940 may be an example of one or more components described with reference to FIG. 1, such as one or more network disks 180.

For example, the SaaS backup component 920 may be configured as or otherwise support a means for detecting an update to one or more backup configurations for a backup application supported by a DMS, where the backup application is configured to support backup of a set of multiple SaaS applications that are accessible via a set of authentication credentials for a client of the DMS, the update resulting in an updated target version number for the backup application. The SaaS backup component 920 may be configured as or otherwise support a means for obtaining an authenticated version number for the backup application associated with a previous authentication of the backup application to at least one of the set of multiple SaaS applications, where the authenticated version number is dependent on whether the previous authentication of the backup application was to a single SaaS application from among the set of multiple SaaS applications or a combination of multiple software as-as-service applications from among the set of multiple SaaS applications. The SaaS backup component 920 may be configured as or otherwise support a means for comparing a first set of authenticated permissions associated with the authenticated version number to a second set of permissions associated with the update to the one or more backup configurations for the backup application. The SaaS backup component 920 may be configured as or otherwise support a means for triggering, in accordance with a result of the comparing, a reauthentication of the backup application to one or more SaaS applications of the set of multiple SaaS applications. The SaaS backup component 920 may be configured as or otherwise support a means for receiving, at the DMS in accordance with the reauthentication, one or more user inputs indicative of the set of authentication credentials. The SaaS backup component 920 may be configured as or otherwise support a means for reauthenticating the backup application to the one or more SaaS applications using the set of authentication credentials. The SaaS backup component 920 may be configured as or otherwise support a means for obtaining, after reauthenticating the backup application, data from the one or more SaaS applications in accordance with the one or more backup configurations.

For example, the SaaS backup component 920 may be configured as or otherwise support a means for receiving, by a DMS, a request to back up a SaaS application including a set of computing objects, where computing objects within the set of computing objects include respective sets of pages, and where pages within the respective sets of pages include respective sets of data elements and respective sets of metadata. The SaaS backup component 920 may be configured as or otherwise support a means for accessing, by the DMS based on the request and via an API for the SaaS application, first sets of metadata and first sets of data elements of a first set of pages included in a first computing object to obtain a first snapshot of the first computing object. The SaaS backup component 920 may be configured as or otherwise support a means for storing, for each page in the first set of pages included in the first computing object, a respective first set of metadata in one or more first fields of a respective page structure defined by a page schema at the DMS and a respective first set of data elements in a second field of the respective page structure defined by the page schema, where storing the first sets of metadata and the first sets of data elements in respective page structures defined by the page schema results in obtainment of the first snapshot of the first computing object.

By including or configuring the SaaS backup component 920 in accordance with examples as described herein, the system 905 may support techniques for reauthentication of a DMS for multiple applications associated with common credentials and backup and recovery for computing objects with hierarchical page structures, which may provide one or more benefits such as, for example, improved user experience, improved scalability, or improved security, among other possibilities.

Figure 10:
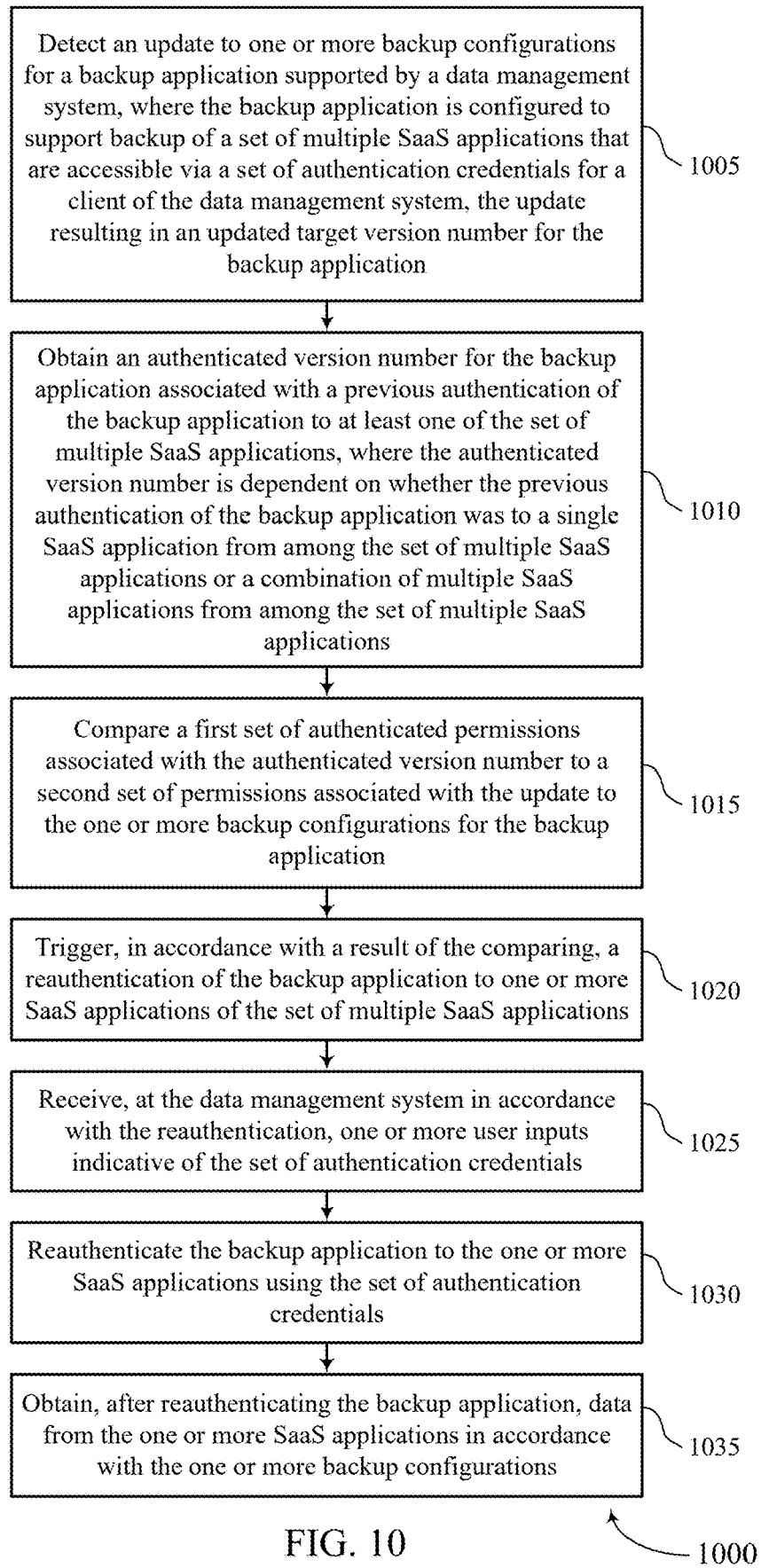
FIGS. 10 through 12 show flowcharts illustrating methods that support backup and recovery for computing objects with hierarchical page structures in accordance with aspects of the present disclosure.

FIG. 10 shows a flowchart illustrating a method 1000 that supports backup and recovery for computing objects with hierarchical page structures in accordance with aspects of the present disclosure. The operations of the method 1000 may be implemented by a DMS or its components as described herein. For example, the operations of the method 1000 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1005, the method may include detecting an update to one or more backup configurations for a backup application supported by a DMS, where the backup application is configured to support backup of a set of multiple SaaS applications that are accessible via a set of authentication credentials for a client of the DMS, the update resulting in an updated target version number for the backup application. The operations of 1005 may be performed in accordance with examples as disclosed herein. In some examples, aspects of the operations of 1005 may be performed by an update component 825 as described with reference to FIG. 8.

At 1010, the method may include obtaining an authenticated version number for the backup application associated with a previous authentication of the backup application to at least one of the set of multiple SaaS applications, where the authenticated version number is dependent on whether the previous authentication of the backup application was to a single SaaS application from among the set of multiple SaaS applications or a combination of multiple software as-as-service applications from among the set of multiple SaaS applications. The operations of 1010 may be performed in accordance with examples as disclosed herein. In some examples, aspects of the operations of 1010 may be performed by a version number component 830 as described with reference to FIG. 8.

At 1015, the method may include comparing a first set of authenticated permissions associated with the authenticated version number to a second set of permissions associated with the update to the one or more backup configurations for the backup application. The operations of 1015 may be performed in accordance with examples as disclosed herein. In some examples, aspects of the operations of 1015 may be performed by a permission component 835 as described with reference to FIG. 8.

At 1020, the method may include triggering, in accordance with a result of the comparing, a reauthentication of the backup application to one or more SaaS applications of the set of multiple SaaS applications. The operations of 1020 may be performed in accordance with examples as disclosed herein. In some examples, aspects of the operations of 1020 may be performed by a reauthentication component 840 as described with reference to FIG. 8.

At 1025, the method may include receiving, at the DMS in accordance with the reauthentication, one or more user inputs indicative of the set of authentication credentials. The operations of 1025 may be performed in accordance with examples as disclosed herein. In some examples, aspects of the operations of 1025 may be performed by a reauthentication component 840 as described with reference to FIG. 8.

At 1030, the method may include reauthenticating the backup application to the one or more SaaS applications using the set of authentication credentials. The operations of 1030 may be performed in accordance with examples as disclosed herein. In some examples, aspects of the operations of 1030 may be performed by a reauthentication component 840 as described with reference to FIG. 8.

At 1035, the method may include obtaining, after reauthenticating the backup application, data from the one or more SaaS applications in accordance with the one or more backup configurations. The operations of 1035 may be performed in accordance with examples as disclosed herein. In some examples, aspects of the operations of 1035 may be performed by a SaaS data component 845 as described with reference to FIG. 8.

Figure 11:
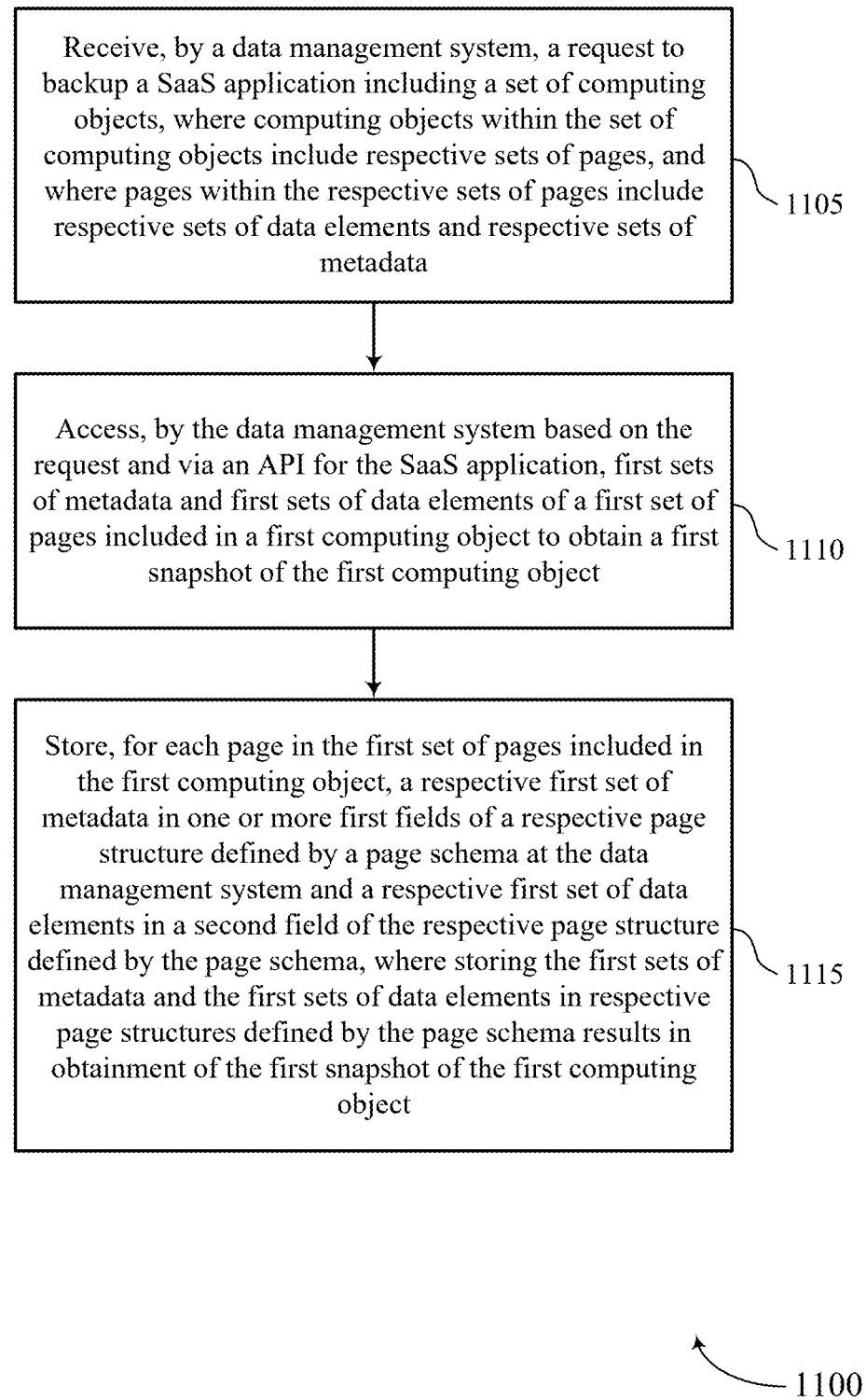

FIG. 11 shows a flowchart illustrating a method 1100 that supports backup and recovery for computing objects with hierarchical page structures in accordance with aspects of the present disclosure. The operations of the method 1100 may be implemented by a DMS or its components as described herein. For example, the operations of the method 1100 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1105, the method may include receiving, by a DMS, a request to back up a SaaS application including a set of computing objects, where computing objects within the set of computing objects include respective sets of pages, and where pages within the respective sets of pages include respective sets of data elements and respective sets of metadata. The operations of 1105 may be performed in accordance with examples as disclosed herein. In some examples, aspects of the operations of 1105 may be performed by a page backup component 850 as described with reference to FIG. 8.

At 1110, the method may include accessing, by the DMS based on the request and via an API for the SaaS application, first sets of metadata and first sets of data elements of a first set of pages included in a first computing object to obtain a first snapshot of the first computing object. The operations of 1110 may be performed in accordance with examples as disclosed herein. In some examples, aspects of the operations of 1110 may be performed by a page access component 855 as described with reference to FIG. 8.

At 1115, the method may include storing, for each page in the first set of pages included in the first computing object, a respective first set of metadata in one or more first fields of a respective page structure defined by a page schema at the DMS and a respective first set of data elements in a second field of the respective page structure defined by the page schema, where storing the first sets of metadata and the first sets of data elements in respective page structures defined by the page schema results in obtainment of the first snapshot of the first computing object. The operations of 1115 may be performed in accordance with examples as disclosed herein. In some examples, aspects of the operations of 1115 may be performed by a page backup component 850 as described with reference to FIG. 8.

Figure 12:
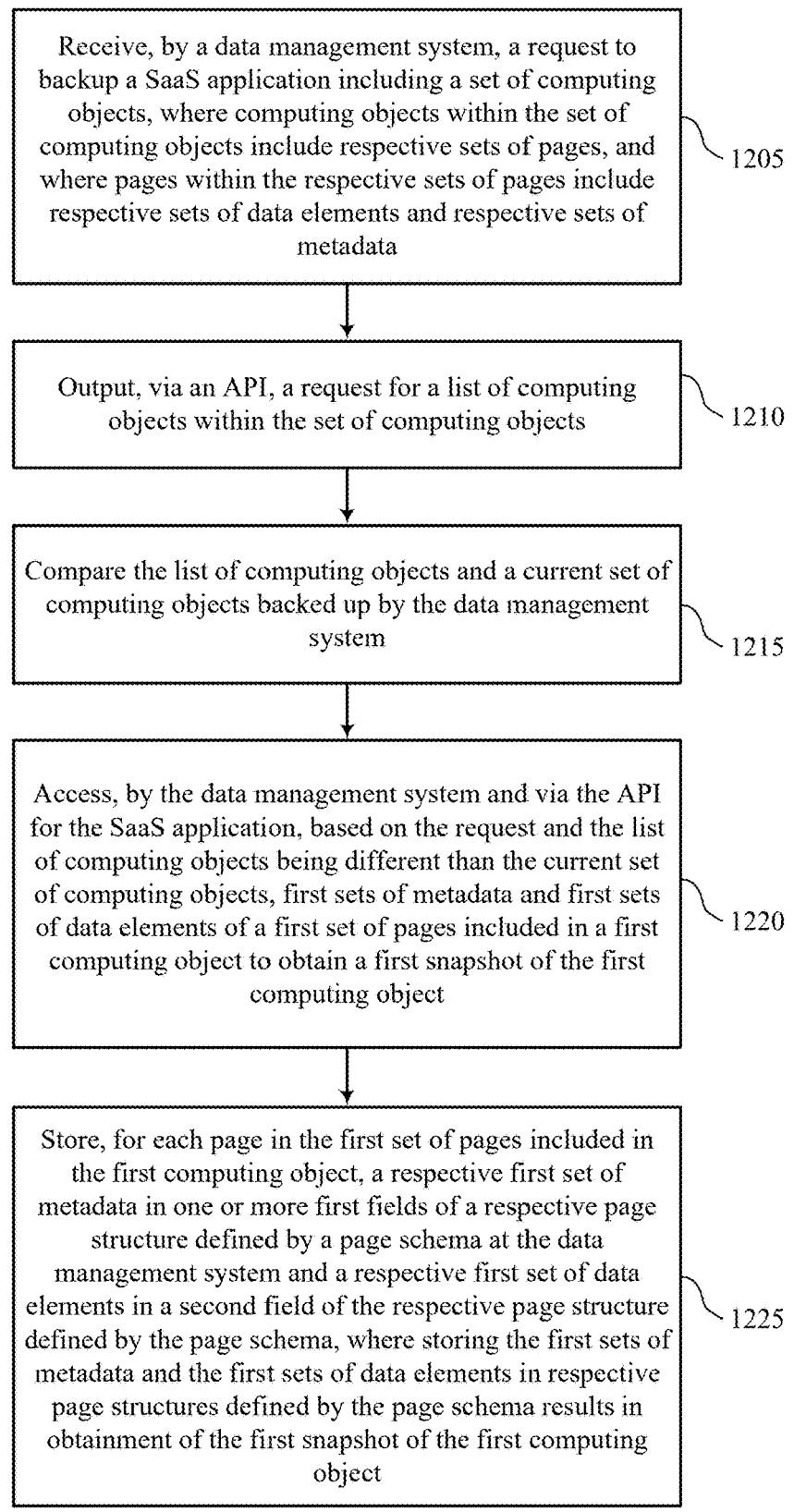

FIG. 12 shows a flowchart illustrating a method 1200 that supports backup and recovery for computing objects with hierarchical page structures in accordance with aspects of the present disclosure. The operations of the method 1200 may be implemented by a DMS or its components as described herein. For example, the operations of the method 1200 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1205, the method may include receiving, by a DMS, a request to back up a SaaS application including a set of computing objects, where computing objects within the set of computing objects include respective sets of pages, and where pages within the respective sets of pages include respective sets of data elements and respective sets of metadata. The operations of 1205 may be performed in accordance with examples as disclosed herein. In some examples, aspects of the operations of 1205 may be performed by a page backup component 850 as described with reference to FIG. 8.

At 1210, the method may include outputting, via an API, a request for a list of computing objects within the set of computing objects. The operations of 1210 may be performed in accordance with examples as disclosed herein. In some examples, aspects of the operations of 1210 may be performed by an API component 870 as described with reference to FIG. 8.

At 1215, the method may include comparing the list of computing objects and a current set of computing objects backed up by the DMS. The operations of 1215 may be performed in accordance with examples as disclosed herein. In some examples, aspects of the operations of 1215 may be performed by a page backup component 850 as described with reference to FIG. 8.

At 1220, the method may include accessing, by the DMS and via the API for the SaaS application, based on the request and the first set of pages in the first computing object is based on the list of computing objects being different than the current set of computing objects, first sets of metadata and first sets of data elements of a first set of pages included in a first computing object to obtain a first snapshot of the first computing object. The operations of 1220 may be performed in accordance with examples as disclosed herein. In some examples, aspects of the operations of 1220 may be performed by a page access component 855 as described with reference to FIG. 8.

At 1225, the method may include storing, for each page in the first set of pages included in the first computing object, a respective first set of metadata in one or more first fields of a respective page structure defined by a page schema at the DMS and a respective first set of data elements in a second field of the respective page structure defined by the page schema, where storing the first sets of metadata and the first sets of data elements in respective page structures defined by the page schema results in obtainment of the first snapshot of the first computing object. The operations of 1225 may be performed in accordance with examples as disclosed herein. In some examples, aspects of the operations of 1225 may be performed by a page backup component 850 as described with reference to FIG. 8.

The following provides an overview of aspects of the present disclosure:

Aspect 1: A method, comprising: detecting an update to one or more backup configurations for a backup application supported by a DMS, wherein the backup application is configured to support backup of a plurality of SaaS applications that are accessible via a set of authentication credentials for a client of the DMS, the update resulting in an updated target version number for the backup application; obtaining an authenticated version number for the backup application associated with a previous authentication of the backup application to at least one of the plurality of SaaS applications, wherein the authenticated version number is dependent on whether the previous authentication of the backup application was to a single SaaS application from among the plurality of SaaS applications or a combination of multiple software as-as-service applications from among the plurality of SaaS applications; comparing a first set of authenticated permissions associated with the authenticated version number to a second set of permissions associated with the update to the one or more backup configurations for the backup application; triggering, in accordance with a result of the comparing, a reauthentication of the backup application to one or more SaaS applications of the plurality of SaaS applications; receiving, at the DMS in accordance with the reauthentication, one or more user inputs indicative of the set of authentication credentials; reauthenticating the backup application to the one or more SaaS applications using the set of authentication credentials; and obtaining, after reauthenticating the backup application, data from the one or more SaaS applications in accordance with the one or more backup configurations.

Aspect 2: The method of aspect 1, wherein comparing the first set of authenticated permissions to the second set of permissions further comprises: comparing a first permission scope of the first set of authenticated permissions to a second permission scope of the second set of permissions, wherein triggering the reauthentication is based at least in part on the second permission scope being greater than the first permission scope.

Aspect 3: The method of aspect 2, wherein the first permission scope is based at least in part on the authenticated version number being associated with a first quantity of SaaS application of the plurality of SaaS applications, and the second permission scope is based at least in part on the updated target version number being associated with a second quantity of SaaS applications of the plurality of SaaS applications, the reauthentication is triggered in accordance with the second quantity being a superset of the first quantity.

Aspect 4: The method of any of aspects 1 through 3, further comprising: detecting, after reauthenticating the backup application, a second update to the one or more backup configurations for the backup application supported by the DMS; and refraining from performing a second reauthentication based on the second set of permissions being a superset of a third set of permissions associated with the second update to the one or more backup configurations for the backup application.

Aspect 5: The method of any of aspects 1 through 4, wherein the update comprises an addition of a SaaS application of the plurality of SaaS applications that the backup application is configured to support for the client, and the reauthentication is triggered in accordance with the addition of the SaaS application.

Aspect 6: The method of any of aspects 1 through 5, wherein the update comprises a change to one or more backup or recovery services provided by the backup application supported by the DMS, and the reauthentication is triggered in accordance with the change to the one or more backup or recovery services provided by the backup application.

Aspect 7: The method of any of aspects 1 through 6, wherein the plurality of SaaS applications that the backup application is configured to support are associated with a single application provider, and the one or more SaaS applications are a subset of the plurality of SaaS applications that are associated with the single application provider.

Aspect 8: The method of any of aspects 1 through 7, wherein reauthenticating the backup application further comprises: storing authorization metadata comprising a client identifier of the client, a first indication of an authorizing user associated with the client, a second indication of an application provider, a third indication of the set of authentication credentials, a primary key, or any combination thereof.

Aspect 9: The method of any of aspects 1 through 8, wherein the set of authentication credentials for the client of the DMS are associated with a single application provider.

Aspect 10: The method of any of aspects 1 through 9, further comprising: storing, after reauthenticating the backup application, the updated target version number in association with a client identifier for the client and an indication of the one or more SaaS applications to which the backup application is authenticated as a result of the reauthentication, wherein the updated target version number is used as the authenticated version number for a subsequent update to at least one backup configuration for the backup application.

Aspect 11: The method of any of aspects 1 through 10, wherein the first set of permissions comprises one or more latest available permissions used by the backup application prior to the update of the one or more backup configurations.

Aspect 12: A method, comprising: receiving, by a DMS, a request to back up a SaaS application comprising a set of computing objects, wherein computing objects within the set of computing objects comprise respective sets of pages, and wherein pages within the respective sets of pages comprise respective sets of data elements and respective sets of metadata; accessing, by the DMS based at least in part on the request and via an API for the SaaS application, first sets of metadata and first sets of data elements of a first set of pages included in a first computing object to obtain a first snapshot of the first computing object; and storing, for each page in the first set of pages included in the first computing object, a respective first set of metadata in one or more first fields of a respective page structure defined by a page schema at the DMS and a respective first set of data elements in a second field of the respective page structure defined by the page schema, wherein storing the first sets of metadata and the first sets of data elements in respective page structures defined by the page schema results in obtainment of the first snapshot of the first computing object.

Aspect 13: The method of aspect 12, further comprising: outputting, via the API, a request for a list of computing objects within the set of computing objects; and comparing the list of computing objects and a current set of computing objects backed up by the DMS, wherein accessing the first sets of metadata and the first sets of data elements of the first set of pages in the first computing object is based at least in part on the list of computing objects being different than the current set of computing objects.

Aspect 14: The method of any of aspects 12 through 13, wherein accessing the first sets of metadata and the first sets of data elements of the first set of pages comprises: retrieving a first synchronization token associated with a second snapshot prior to the first snapshot, wherein the first synchronization token indicates a first start time and a first completion time associated with the second snapshot; outputting, via the API, a request for a list of pages within the first computing object that have changed since the first completion time; obtaining, in response to the request, an indication of the first set of pages that have changed since the first completion time, wherein accessing the first sets of metadata and the first sets of data elements of the first set of pages is based at least in part on obtaining the indication of the first set of pages; and storing a second synchronization token indicative of a second start time and a second completion time associated with the first snapshot.

Aspect 15: The method of aspect 14, wherein the second start time is the first completion time, and the second completion time is a current time associated with the obtainment of the first snapshot.

Aspect 16: The method of any of aspects 12 through 13, wherein accessing the first sets of metadata and the first sets of data elements of the first set of pages comprises: outputting, via the API, a request for a first list of pages within the first computing object; and obtaining, in response to the request, an indication of the first set of pages, wherein accessing at least a subset of the first sets of metadata and at least a subset of the first sets of data elements of the first set of pages is based at least in part on obtaining the indication of the first set of pages.

Aspect 17: The method of aspect 16, further comprising: halting a backup procedure of the first set of pages, wherein a completion time associated with the first snapshot is based at least in part on halting the backup procedure.

Aspect 18: The method of aspect 17, further comprising: outputting, via the API after halting the backup procedure, a second request for a second list of pages within the first computing object that have changed since the completion time; and obtaining, in response to the second request an indication of remaining pages in the first set of pages, and wherein remaining first sets of metadata and remaining first sets of data elements are accessed using the indication of the remaining pages in the first set of pages.

Aspect 19: The method of any of aspects 12 through 18, wherein the respective first set of metadata comprises a first page identifier for the page, a first page title of the page, a key associated with the first computing object, or any combination thereof.

Aspect 20: The method of any of aspects 12 through 19, wherein storing the respective first set of data elements in the second field comprises: storing the respective first set of data elements in a binary large object (BLOB) data store; and storing, in the second field of the respective page structure, an identifier for the respective first set of data elements as stored in the BLOB data store.

Aspect 21: The method of any of aspects 12 through 20, wherein the first snapshot is an incremental snapshot dependent on a previous snapshot.

Aspect 22: An apparatus comprising one or more memories storing processor-executable code, and one or more processors coupled with the one or more memories and individually or collectively operable to execute the code to cause the apparatus to perform a method of any of aspects 1 through 11.

Aspect 23: An apparatus comprising at least one means for performing a method of any of aspects 1 through 11.

Aspect 24: A non-transitory computer-readable medium storing code the code comprising instructions executable by one or more processors to perform a method of any of aspects 1 through 11.

Aspect 25: An apparatus comprising one or more memories storing processor-executable code, and one or more processors coupled with the one or more memories and individually or collectively operable to execute the code to cause the apparatus to perform a method of any of aspects 12 through 21.

Aspect 26: An apparatus comprising at least one means for performing a method of any of aspects 12 through 21.

Aspect 27: A non-transitory computer-readable medium storing code the code comprising instructions executable by one or more processors to perform a method of any of aspects 12 through 21.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving, by a data management system, a request to back up a software-as-a-service application comprising a set of computing objects, wherein computing objects within the set of computing objects comprise respective sets of pages, and wherein pages within the respective sets of pages comprise respective sets of data elements and respective sets of metadata;
   accessing, by the data management system based at least in part on the request and via an application programming interface for the software-as-a-service application, first sets of metadata and first sets of data elements of a first set of pages included in a first computing object to obtain a first snapshot of the first computing object; and
   storing, for each page in the first set of pages included in the first computing object, a respective first set of metadata in one or more first fields of a respective page structure defined by a page schema at the data management system and a respective first set of data elements in a second field of the respective page structure defined by the page schema, wherein storing the first sets of metadata and the first sets of data elements in respective page structures defined by the page schema results in obtainment of the first snapshot of the first computing object.

2. The method of claim 1, further comprising:
   outputting, via the application programming interface, a request for a list of computing objects within the set of computing objects; and
   comparing the list of computing objects and a current set of computing objects backed up by the data management system, wherein accessing the first sets of metadata and the first sets of data elements of the first set of pages in the first computing object is based at least in part on the list of computing objects being different than the current set of computing objects.

3. The method of claim 1, wherein accessing the first sets of metadata and the first sets of data elements of the first set of pages comprises:
   retrieving a first synchronization token associated with a second snapshot prior to the first snapshot, wherein the first synchronization token indicates a first start time and a first completion time associated with the second snapshot;
   outputting, via the application programming interface, a request for a list of pages within the first computing object that have changed since the first completion time;
   obtaining, in response to the request, an indication of the first set of pages that have changed since the first completion time, wherein accessing the first sets of metadata and the first sets of data elements of the first set of pages is based at least in part on obtaining the indication of the first set of pages; and
   storing a second synchronization token indicative of a second start time and a second completion time associated with the first snapshot.

4. The method of claim 3, wherein the second start time is the first completion time, and wherein the second completion time is a current time associated with the obtainment of the first snapshot.

5. The method of claim 1, wherein accessing the first sets of metadata and the first sets of data elements of the first set of pages comprises:
- outputting, via the application programming interface, a request for a first list of pages within the first computing object; and
- obtaining, in response to the request, an indication of the first set of pages, wherein accessing at least a subset of the first sets of metadata and at least a subset of the first sets of data elements of the first set of pages is based at least in part on obtaining the indication of the first set of pages.

6. The method of claim 5, further comprising:
halting a backup procedure of the first set of pages, wherein a completion time associated with the first snapshot is based at least in part on halting the backup procedure.

7. The method of claim 6, further comprising:
- outputting, via the application programming interface after halting the backup procedure, a second request for a second list of pages within the first computing object that have changed since the completion time;
- obtaining, in response to the second request, an indication of remaining pages in the first set of pages; and
- access remaining first sets of metadata and remaining first sets of data elements using the indication of the remaining pages in the first set of pages.

8. The method of claim 1, wherein the respective first set of metadata for a page comprises a first page identifier for the page, a first page title of the page, a key associated with the first computing object, or any combination thereof.

9. The method of claim 1, wherein storing the respective first set of data elements in the second field comprises:
- storing the respective first set of data elements in a binary large object (BLOB) data store; and
- storing, in the second field of the respective page structure, an identifier for the respective first set of data elements as stored in the BLOB data store.

10. The method of claim 1, wherein the first snapshot is an incremental snapshot dependent on a previous snapshot.

11. An apparatus, comprising:
- one or more memories storing processor-executable code; and
- one or more processors coupled with the one or more memories and individually or collectively operable to execute the code to cause the apparatus to:
  - receive, by a data management system, a request to back up a software-as-a-service application comprising a set of computing objects, wherein computing objects within the set of computing objects comprise respective sets of pages, and wherein pages within the respective sets of pages comprise respective sets of data elements and respective sets of metadata;
  - access, by the data management system based at least in part on the request and via an application programming interface for the software-as-a-service application, first sets of metadata and first sets of data elements of a first set of pages included in a first computing object to obtain a first snapshot of the first computing object; and
  - store, for each page in the first set of pages included in the first computing object, a respective first set of metadata in one or more first fields of a respective page structure defined by a page schema at the data management system and a respective first set of data elements in a second field of the respective page structure defined by the page schema, wherein storage of the first sets of metadata and the first sets of data elements in respective page structures defined by the page schema is configured to result in obtainment of the first snapshot of the first computing object.

12. The apparatus of claim 11, wherein the one or more processors are individually or collectively further operable to execute the code to cause the apparatus to:
- output, via the application programming interface, a request for a list of computing objects within the set of computing objects; and
- compare the list of computing objects and a current set of computing objects backed up by the data management system, wherein the one or more processors are individually or collectively operable to execute the code to cause the apparatus to access the first sets of metadata and the first sets of data elements of the first set of pages in the first computing object based at least in part on the list of computing objects being different than the current set of computing objects.

13. The apparatus of claim 11, wherein, to access the first sets of metadata and the first sets of data elements of the first set of pages, the one or more processors are individually or collectively operable to execute the code to cause the apparatus to:
- retrieve a first synchronization token associated with a second snapshot prior to the first snapshot, wherein the first synchronization token indicates a first start time and a first completion time associated with the second snapshot;
- output, via the application programming interface, a request for a list of pages within the first computing object that have changed since the first completion time;
- obtain, in response to the request, an indication of the first set of pages that have changed since the first completion time, wherein the one or more processors are individually or collectively operable to execute the code to cause the apparatus to access the first sets of metadata and the first sets of data elements of the first set of pages based at least in part on obtaining the indication of the first set of pages; and
- store a second synchronization token indicative of a second start time and a second completion time associated with the first snapshot.

14. The apparatus of claim 13, wherein the second start time is the first completion time, and wherein the second completion time is a current time associated with the obtainment of the first snapshot.

15. The apparatus of claim 11, wherein, to access the first sets of metadata and the first sets of data elements of the first set of pages, the one or more processors are individually or collectively operable to execute the code to cause the apparatus to:
- output, via the application programming interface, a request for a first list of pages within the first computing object; and
- obtain, in response to the request, an indication of the first set of pages, wherein the one or more processors are individually or collectively operable to execute the code to cause the apparatus to access at least a subset of the first sets of metadata and at least a subset of the first sets of data elements of the first set of pages based at least in part on obtaining the indication of the first set of pages.

16. The apparatus of claim 15, wherein the one or more processors are individually or collectively further operable to execute the code to cause the apparatus to:
- halt a backup procedure of the first set of pages, wherein a completion time associated with the first snapshot is based at least in part on halting the backup procedure.

17. The apparatus of claim 16, wherein the one or more processors are individually or collectively further operable to execute the code to cause the apparatus to:
- output, via the application programming interface after halting the backup procedure, a second request for a second list of pages within the first computing object that have changed since the completion time;
- obtain, in response to the second request, an indication of remaining pages in the first set of pages; and
- access remaining first sets of metadata and remaining first sets of data elements using the indication of the remaining pages in the first set of pages.

18. The apparatus of claim 11, wherein the respective first set of metadata for a page comprises a first page identifier for the page, a first page title of the page, a key associated with the first computing object, or any combination thereof.

19. The apparatus of claim 11, wherein, to store the respective first set of data elements in the second field, the one or more processors are individually or collectively operable to execute the code to cause the apparatus to:
- store the respective first set of data elements in a binary large object (BLOB) data store; and
- store, in the second field of the respective page structure, an identifier for the respective first set of data elements as stored in the BLOB data store.

20. A non-transitory computer-readable medium storing code, the code comprising instructions executable by one or more processors to:
- receive, by a data management system, a request to back up a software-as-a-service application comprising a set of computing objects, wherein computing objects within the set of computing objects comprise respective sets of pages, and wherein pages within the respective sets of pages comprise respective sets of data elements and respective sets of metadata;
- access, by the data management system based at least in part on the request and via an application programming interface for the software-as-a-service application, first sets of metadata and first sets of data elements of a first set of pages included in a first computing object to obtain a first snapshot of the first computing object; and
- store, for each page in the first set of pages included in the first computing object, a respective first set of metadata in one or more first fields of a respective page structure defined by a page schema at the data management system and a respective first set of data elements in a second field of the respective page structure defined by the page schema, wherein storing the first sets of metadata and the first sets of data elements in respective page structures defined by the page schema results in obtainment of the first snapshot of the first computing object.

\* \* \* \* \*